United States Patent [19]
Shibuya

[11] Patent Number: 5,808,786
[45] Date of Patent: Sep. 15, 1998

[54] OPTICAL FIBER AMPLIFYING DEVICE AND METHOD THEREFOR

[75] Inventor: Takashi Shibuya, Tokyo, Japan

[73] Assignee: NEC Corporation, Tokyo, Japan

[21] Appl. No.: 768,777

[22] Filed: Dec. 13, 1996

[30] Foreign Application Priority Data

Dec. 14, 1995 [JP] Japan ................................. 7-325470

[51] Int. Cl.⁶ ........................................................ H01S 3/00
[52] U.S. Cl. ............................................ 359/341; 359/160
[58] Field of Search ..................................... 359/341, 160

[56] References Cited

U.S. PATENT DOCUMENTS

| 5,315,674 | 5/1994 | Asako . | |
|---|---|---|---|
| 5,343,320 | 8/1994 | Anderson | 354/160 |
| 5,497,265 | 3/1996 | Fontana et al. | 359/341 |
| 5,506,723 | 4/1996 | Junginger | 359/341 |
| 5,561,552 | 10/1996 | Shibuya | 359/341 |
| 5,579,153 | 11/1996 | Laming et al. | 359/341 |
| 5,581,397 | 12/1996 | Maki et al. | 359/341 |
| 5,652,675 | 7/1997 | Shibuya | 359/341 |

FOREIGN PATENT DOCUMENTS

| 0 647 000 A1 | 4/1994 | European Pat. Off. . |
| 3134632 | 6/1991 | Japan . |
| 3180819 | 8/1991 | Japan . |
| 04 023528 | 1/1992 | Japan . |
| 496287 | 3/1992 | Japan . |
| 5-327106 | 12/1993 | Japan . |
| 5-347444 | 12/1993 | Japan . |
| 6-314833 | 11/1994 | Japan . |

OTHER PUBLICATIONS

European Search Report, dated Feb. 17, 1998.
M. Karasek, "Anaylsis of Gain Improvement of Pr3+-doped Fluoride Amplifiers Using an Optical Filter or Isolator", Optics Communications, vol. 107, Apr. 14, 1994, pp. 235-239.
Copy of Japanese Office Action with translation of pertient portions of the above-listed patent documents.

Primary Examiner—Mark Hellner
Attorney, Agent, or Firm—McGinn & Gibb, P.C.

[57] ABSTRACT

First and second independent optical fiber amplifiers, which preferably include first and second rare-earth doped optical fibers, respectively, are provided in a two-stage series or parallel configuration. An optical divider for dividing and taking out pumping light to a side opposite where the pumping light is combined, is coupled to the first optical fiber. An optical combiner combines the divided pumping light with the second optical fiber from a side opposite to a pumping light source. The amplification efficiency is promoted by using the pumping light which has not been used in the one optical fiber amplifier by inputting it to the other, and vice versa. Preferably, wavelength filters block naturally emitting light to first and second optical combining and dividing instruments. Alternatively, wavelength filters block signal light in inputting the divided pumping light to the optical fiber amplifier on the other side.

48 Claims, 21 Drawing Sheets

OPTICAL FIBER AMPLIFYING DEVICE AND METHOD THEREFOR

BACKGROUND OF THE INVENTION

The present invention generally relates to a method and optical fiber amplifier for amplifying an input signal light by pumping light and for outputting it, and more particularly to a method and optical fiber amplifier arrangement including first and second independent optical fiber amplifiers each including a rare-earth doped optical fiber etc., to thereby achieve greater amplification efficiency.

DESCRIPTION OF THE RELATED ART

With increasing development of optical fiber amplifiers, requirements for the optical fiber amplifier such as high gain, high output etc. thereof have been increased. Conventionally, only forward pumping or only backward pumping configurations have been employed in optical fiber amplifiers. These arrangements both suffer from a high "noise figure" because, as the pumping light becomes remote from the source, the pumping power becomes low and the low pumping power causes noise.

To achieve high gain and high output of the optical fiber amplifier, other than having high output of a pumping light source, several solutions have been proposed including partial doping of the core of a rare-earth doped optical fiber, connecting two stages of rare-earth doped optical fibers in series, and a configuration in which excited light is efficiently utilized.

The two-stage, tandem (series)-connected, rare-earth doped optical fiber arrangement has been disclosed in, for example, Japanese Patent Application No. 272895/1989 and Japanese Patent Application No. 206705/1990.

Examples of these conventional arrangements are shown in FIGS. 17 and 18 of the present application. An optical fiber amplifier having excellent output controllability even in a high output region/saturation region, and an optical fiber amplifier with low noise, high gain and high output are realized by connecting in series two stages of rare-earth doped optical fibers. Typically, saturation power depends on the amplifier design. Generally, the merit of two-stage optical amplifiers is that a single erbium-doped fiber (EDF) amplifier has an output power proportional to the pumping power until the output power (saturation power) is reached. Thus, the output power of the signal EDF amplifier is controllable until the saturation output power. Further, for the first optical amplifier, a low noise amplifier is designed, whereas for the second optical amplifier a high output power amplifier is desired. Thus, a two-stage optical amplifier is for realizing low noise and high output power.

Meanwhile, Japanese Patent Application No. 320901/1989 discloses a method of efficiently utilizing pumping light. An example of this conventional arrangement is shown in FIG. 19, in which pumping light is injected into a rare-earth doped optical fiber and is used for exciting the rare-earth doped optical fiber. However, not all of the injected pumping light is used for pumping, but indeed some portions of the pumping light transmit through the rare-earth doped optical fiber. This is a problem.

In the conventional arrangement, the pumping light which has been transmitted without being used for pumping is branched by an optical combining and dividing instrument 4 (e.g., a wavelength division-multiplexer (WDM)), and the pumping light is again returned to the rare-earth doped optical fiber by being reflected back by a high-reflection mirror 22. The conversion efficiency (optical output power per pumping light power) can be increased with such an arrangement.

As shown in FIG. 20, another conventional high output and high gain optical fiber amplifier further promotes the pumping efficiency by combining the above-mentioned optical fiber amplifiers for providing high output and high gain. As shown in FIG. 20, two stages of rare-earth doped optical fibers are connected in series and each rare-earth doped optical amplifier uses an arrangement combining an optical combining and dividing instrument and a high-reflection reflector.

FIG. 21 illustrates a configuration in which first and second amplifiers are connected by an optical filter modules which has an ASE-cutting disadvantage.

The above conventional arrangements have several problems. For example, a portion of the optical pumping power is not utilized in the configurations of FIGS. 17, 18, and 21. This decreases the system efficiency.

Moreover, in the configuration of FIG. 19, a single-stage optical amplifier is shown which has the problems mentioned above. Further, a high-reflection mirror is required, thereby making the system larger and assembly more difficult.

Further, with the arrangement of FIG. 20, to achieve the highest pumping efficiency, four optical combining and dividing instruments and two total reflectors are necessary. Hence, the number of system parts is large, resulting in a high-cost and large optical fiber amplifier.

Furthermore, as alluded to above with regard to the other conventional configurations, the size and number of components of the conventional arrangements are unduly large, thereby causing the entire devices to be large and cumbersome and thereby requiring increased manufacturing and assembly steps and increased costs.

SUMMARY OF THE INVENTION

In view of the foregoing problems of the conventional systems, it is therefore an object of the present invention to eliminate the above-mentioned drawbacks of the conventional optical fiber amplifying devices, and to provide an optical fiber amplifying device which achieves greater pumping efficiency etc. without considerably increasing the size or the number of parts in the device.

Another object of the present invention is to promote pumping efficiency and to thereby achieve low current of a pumping light source, promotion of gain and high output in an optical fiber amplifying device in a two-stage construction or independent two-direction transmission.

To achieve the above objects, in a first aspect of the present invention, an optical fiber amplifying unit includes a first optical fiber amplifier including a first fiber amplifying medium in which a first signal light having a specific signal wavelength is inputted and an pumping light is applied from an external portion, thereby amplifying and outputting the signal light, a first light source for outputting a first pumping light having a first pumping wavelength and exciting the first fiber amplifying medium and a first optical combiner coupling the first pumping light to the first fiber amplifying medium, the first optical fiber amplifier outputting a first amplified signal light by amplifying the first signal light and a second optical fiber amplifier outputting a second amplified signal light by amplifying a second signal light with a similar construction.

Preferably, the second optical fiber amplifier further includes an optical divider outputting a divided pumping light by dividing a second pumping light from the second amplified signal light, a divided pumping light guiding optical path for guiding the divided pumping light and a divided pumping light combining device for coupling the divided pumping light to the first rare-earth doped optical fiber.

That is, the optical fiber amplifying unit of the present invention includes two independent optical fiber amplifiers, in which excessive light of a pumping light source of a first optical fiber amplifier after transmitting through the fiber amplifying medium is inputted to a second fiber amplifying medium. With the invention, the conversion efficiency of the optical fiber amplifying unit is increased by effectively utilizing the pumping light by inputting excessive pumping light transmitted through a first fiber amplifying medium to the second fiber amplifying medium.

Preferably, an optical fiber doped with a rare-earth element such as erbium is used, even though any fiber amplifying medium can be used so long as it can amplify and output a signal light by a pumping light applied from an external source.

The first and second optical fiber amplifiers forming the optical fiber amplifying unit of the present invention preferably have an arrangement for respectively and independently amplifying and outputting a signal light, or may have a "multi-stage" arrangement in which both the amplifiers are connected in series (tandem) and a first amplified signal light which has been amplified by the first optical fiber amplifier is inputted to the second optical fiber amplifier as it is as an input signal thereto.

The first arrangement (e.g., the "independent construction") is applicable to, for example, an optical fiber amplifying unit for use in an optical repeater amplifying and sending respective signals transmitted in respective forward and backward directions. Obviously, this arrangement is useful in a system having a plurality of light transmitting paths transmitting signals in the same direction. Meanwhile, the "multi-stage construction" is useful in an optical fiber amplifying unit comprising a multi-stage amplification structure requiring higher gain.

Several different arrangements can be employed with the "independent construction" and the "multistage construction", depending on the positions where the light combiners for combining the pumping light from the pumping light sources to the rare-earth doped optical fiber are positioned (e.g., depending on so-called "forward pumping" or "backward pumping").

In a first embodiment, in the first optical fiber amplifier the first optical combiner is arranged at an input side of the first rare-earth doped optical fiber, and in the second optical fiber amplifier the second optical combiner is arranged at an input side of the second rare-earth doped optical fiber, respectively. Both of the rare-earth doped optical fibers are excited by a pumping light from a "forward direction". The optical divider is arranged at an output side of the second rare-earth doped optical fiber and the optical combiner combining the divided pumping light is arranged between the first rare-earth doped optical fiber and the second optical combiner.

According to another embodiment (as shown for example in FIG. 4), the first optical combiner is arranged at the output side of the rare-earth doped optical fiber and the second optical combiner is arranged at the output side of the second rare-earth doped optical fiber, respectively. The optical divider is arranged between the first optical combiner and the second rare-earth doped optical fiber. That is, both fibers are excited with "backward pumping". With this arrangement, the optical combiner combining the divided pumping light is arranged at the input side of the first rare-earth doped optical fiber.

According to yet another embodiment (as shown, for example, in FIG. 5), the first optical combiner is arranged at the input side of the first rare-earth doped optical fiber and the second optical combiner is arranged at the output side of the second rare-earth doped optical fiber. Thus, this arrangement uses a combination of "forward pumping" and "backward pumping". With this embodiment, the optical divider is arranged at the input side of the second rare-earth doped optical fiber and the optical combiner combining the divided pumping light is arranged between the output side of the first rare-earth doped optical fiber and the optical divider.

Further, according to a further embodiment (as shown, for example, in FIG. 6), which is opposite the immediately above-mentioned embodiment, the first optical combiner is arranged at the output side of the first rare-earth doped optical fiber and the second optical combiner is arranged at the input side of the second rare-earth doped optical fiber. Also, the optical divider is arranged at the output side of the second rare-earth doped optical fiber and the optical combiner is arranged at the input side of the first rare-earth doped optical fiber.

The above embodiments are applicable to when the first optical fiber amplifier and the second optical fiber amplifier are independent (e.g., not connected to the optical signal path, as in FIGS. 7 and 8) from each other, as well as to an optical fiber amplifying unit having a two-stage structure in which the output of the first optical fiber amplifier is connected (e.g., series connected; in other words connected in tandem) to the input of the second optical fiber amplifier.

To further promote pumping efficiency, in-line optical isolators also may be arranged appropriately to eliminate the influence of return light. Specifically, in the first embodiment for example, an in-line optical isolator may be arranged opposed to the first rare-earth doped optical fiber with respect to the first optical combiner in the first optical fiber amplifier. Conversely, the in-line isolator may be arranged opposed to the second rare-earth doped optical fiber with respect to the optical divider in the second optical fiber amplifier.

Noise may be generated when, in coupling the divided pumping light again to the optical fiber by the optical combiner, if the signal light is coupled again to the transmitting path. Thus, the present invention arranges a wavelength filter transmitting only light having the pumping wavelength and blocking light having the signal light wavelength when combining the divided pumping light. Hence, only the pumping light is combined again to the rare-earth doped optical fiber, and accordingly high quality signals are maintained during amplification. Regarding the wavelength filter, the wavelength filter may be arranged independently in the transmitting path, or may be integrated with the optical divider or the optical combiner.

Hence, in forming a two-stage optical fiber amplifying unit, the second optical combiner and the optical combiner combining the divided pumping light may be integrally formed.

Further, a signal light filter blocking a naturally-emitting light and selectively transmitting only the first amplified signal light can be arranged between the optical combiner combining the divided pumping light and the second optical combiner. Thus, amplification noise can be attenuated.

With the unique and unobvious structure and method of the invention, the above-mentioned problems of the conventional optical fiber amplifying units are overcome, and greater pumping efficiency is achieved without considerably increasing the size or the number of system parts. Further, with the invention, a pumping light source has a low current, and high gain and high output are achieved in an optical fiber amplifying unit in a two-stage construction or independent two-direction transmission.

Another advantage of the present invention is that it is unnecessary to have pumping power cutting filter as in the conventional systems (e.g., pumping power cutting filter 36 in FIG. 11) in the output side of the second EDF amplifier. Hence, a more efficient, but less complex, system results.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
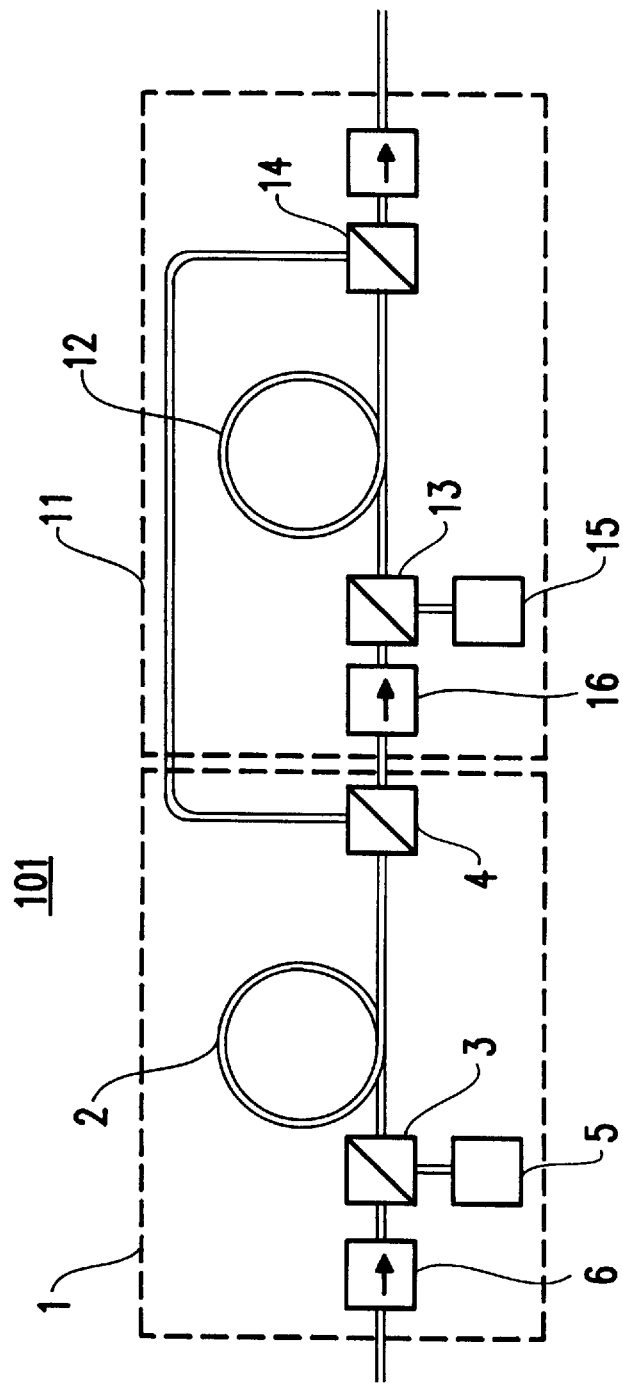
FIG. 1 illustrates an optical fiber amplifying unit 101 according to a first embodiment of the present invention.

Referring now to the drawings, and more particularly to FIG. 1, there is shown an optical fiber amplifying unit according to a first embodiment of the present invention.

An optical fiber amplifier 1 comprises an erbium-doped optical fiber 2, optical combining and dividing instruments (WDMs) 3 and 4, a pumping light source 5 and an in-line optical isolator 6.

A second optical fiber amplifier 11 comprises an erbium-doped optical fiber 12, optical combining and dividing instruments (WDMs) 13 and 14, a pumping light source 15 and in-line optical isolators 16 and 17. In addition to or alternatively to an erbium-doped optical fiber, other types of optical filters may be employed, such as Praseodymium-doped fibers, Neodymium-doped fibers, or other rare-earth ion-doped fibers. For purposes of discussion, the present invention is assumed to use an Er-doped fiber in which the signal has a wavelength of 1.55 $\mu$m and the pumping light has a wavelength of 1.48 $\mu$m or 0.98 $\mu$m. If a Praseodymium or Nd fiber were employed, for example, the signal light would have a wavelength of 1.31 $\mu$m and the pumping light would have a wavelength of 1.06 $\mu$m According to the first embodiment, the two optical fiber amplifiers 1, 11 are connected in series (tandem), thus forming an optical fiber amplifier 101. Pumping light outputted from the pumping light source 5, preferably having a wavelength of 1.45 $\mu$m to approximately 1.50 $\mu$m, and more preferably 1.48 $\mu$m (as mentioned above, a wavelength in the range of 0.97–0.99 $\mu$m, and more preferably 0.98 $\mu$m, can also be used), is injected to the erbium-doped optical fiber 2 via the WDM 3 by which the erbium-doped optical fiber 2 is excited ("pumped").

The pumping source may be one or a plurality of pumping sources coupled together. If a plurality of sources are provided, then also provided are beam polarizers coupled by polarizing mating fiber and polarization beam splitters (e.g., preferably formed by multi-layer dielectric films or the like) which serve to pass the P wave and reflect the S wave to combine them. Polarization of each source is 90° for S and P waves. The WDM 3 (as well as WDMs 4, 13, and 14 mentioned below) may be formed by a beam splitter or preferably a fiber-fused device (such as a WDM fused-type device or a fused coupler). However, while the WDMs 3, 4, 13 and 14 are preferably a fused-type device, they may alternatively be gravity-type or filter-type devices.

A portion (typically 20–40% depending upon the system design and the condition of the amplifier, including pumping power, the erbium-doped fiber (EDF), input signal light power, etc.) of the pumping light which could not be used for pumping the erbium-doped optical fiber 2, is branched by the WDM 4 to the erbium-doped optical fiber 12 from a pumping light input terminal of the WDM 14, thus contributing to the amplification at the erbium-doped optical fiber 12. The fibers 2 and 12 preferably have lengths within a range of 10–100 m.

Meanwhile, the pumping light outputted from the pumping light source 15, preferably having a wavelength within a range of 1.45 $\mu$m–1.50 $\mu$m and more preferably 1.48 $\mu$m (as mentioned above, a wavelength in the range of 0.97–0.99 $\mu$m, and more preferably 0.98 $\mu$m, can also be used), is injected to the erbium-doped optical fiber 12 via the WDM 13 and excites the erbium-doped optical fiber 12. Preferably, the pumping light from sources 4 and 15 should be identical or substantially the same, and the wavelengths are in the same wavelength band. A portion of the pumping light which could not be used in exciting the erbium-doped optical fiber 12 is branched by the WDM 14, to the erbium-doped optical fiber 2 from an pumping light input terminal of the WDM 4, thus contributing to the amplification of the erbium-doped optical fiber 2.

While the formation of the two-stage connection has been described above, the same is applicable to when two optical fiber amplifiers are formed independently from one another and are connected according to the present invention.

Hereinbelow, the optical fiber amplifying unit of the present invention is described in detail with reference to the drawings.

The optical fiber amplifying unit 101 includes the first and second optical fiber amplifiers 1, 11 connected in series. The optical fiber amplifier 1 includes the erbium-doped optical fiber 2, the WDMs 3, 4, a pumping source preferably comprising a laser diode (LD) module 5 preferably having a wavelength within a range of 1.45 μm–1.50 μm and more preferably 1.48 μm (as mentioned above, a wavelength in the range of 0.97–0.99 μm, and more preferably 0.98 μm, can also be used), and a polarization independent-type, in-line optical isolator 6.

The fiber-fused WDMs 3, 4 are optical combining and dividing instruments which preferably divide and multiply bands, respectively, having wavelengths within the ranges of 1.45 μm–1.50 μm and 1.53–1.57 μm and more preferably 1.48 μm and 1.55 μm, respectively, in accordance with their wavelengths.

The optical fiber amplifier 11 includes the erbium-doped optical fiber 12, the fiber-fused WDMs 13, 14, a pumping LD module 15 for preferably outputting a pumping light having a wavelength within a range of 1.45 μm–1.50 μm and more preferably 1.48 μm, and polarization independent-type, in-line optical isolators 16 and 17. The fiber-fused WDMs 13, 14 are also optical combining and dividing instruments which divide and multiply bands respectively, having wavelengths preferably within ranges of 1.45 μm–1.50 μm and 1.53–1.57 μm and more preferably 1.48 μm and 1.55 μm, respectively, in accordance with their wavelengths.

According to the first optical fiber amplifier 1, the erbium-doped optical fiber 2 is preferably designed such that a signal light having the wavelength 1.55 μm, −15 dBm is amplified to that of +4 dBm. Additionally, the noise figure is designed to be 5.5 dB. Of course, the above operating characteristics are merely representative and other operating parameters can be equally designed. For example, the above optical characteristics depend on the EDF design, for example, the core diameter, fiber length, dopant concentration, dopant diameter, etc.

A transmitting loss of the polarization independent type in-line optical isolator 6 is 1 dB. Therefore, the required noise figure at the erbium-doped optical fiber 2 is 4.5 dB (e.g., 5.5 dB (noise figure) −1 dB=4.5 dB). Briefly, the "noise figure" (NF) is defined as the ratio of the S/N of the input signal light to that of the output signal light (e.g., the amplified light). Therefore, this relationship may be expressed as follows:

NF=10*log[(S/N)input/(S/N)output](dB)

For fiber amplifiers, noise is produced in the EDF. Meanwhile, the loss of the forward device (e.g., the in-line isolator) reduces the input signal power. Therefore, the fiber-amplification noise figure is expressed as:

NFamp.=NF(EDF)+Loss(forward device)

NF depends on the pumping power distribution and EDF length, etc. Typically, forward and backward pumping light will degrade over time (and distance), thereby causing noise. Specifically, very low pumping power (light) causes noise. With its two-stage configuration, the invention uses high forward pumping power at the time that the backward pumping power is low and vice versa, thereby achieving low noise and higher power.

Meanwhile, considering the signal light transmitting loss of 1 dB of the instrument 4, an optical output power of +5 dBm is necessary at an output end of the erbium-doped optical fiber. The required pumping light power for the optical fiber 2 to obtain the signal light output of +5 dBm and the noise figure of 4.5 dB is 60 mW. The conversion efficiency is +5 dBm/60 mW which is the output poser. +5 dBm is equal to 3.16 mW, with the conversion efficiency being 5.3%.

Considering the transmitting loss of instrument 3 and the connection loss between parts, the output pumping light power of the 1.48 μm pumping LD module S is 75 mW.

According to the second optical fiber amplifier 11, the erbium-doped optical fiber 12 is designed such that the signal light having the wavelength 1.55 μm, +4 dBm is amplified to that of +15 dBm. Considering the total transmitting loss of 2 dB of the fused-type optical combining and dividing instrument 14 and the polarization-independent type in-line optical isolator 17, an optical output power of +17 dBm (e.g., 15 dBm +2 dBm (loss) is necessary at an output end of the optical fiber 12. The pumping efficiency of the optical fiber 12 under the conditions is 70% and the pumping light power necessary for obtaining the optical output of +15 dBm is 72 mW. Considering the transmitting loss of instrument 13 and the connection loss between parts, the output pumping light power of the 1.48 μm pumping LD module 15 is about 90 mW.

In the conventional devices, the characteristic of the optical fiber amplifying unit 101, in which the optical fiber amplifiers 1, 11 are connected, is equal to the characteristics of the individual optical fiber amplifiers 1, 11, since the pumping optical output terminals of the fusion-type optical combining and dividing instruments 4, 14 are not connected together.

That is, the pumping light power necessary for amplifying the signal light having the wavelength 1.55 μm, −15 dBm to that of +15 dBm is 75 mW and 90 mW for the 1.48 μm pumping LD modules 5 and 15, respectively. The noise figure $NF_{total}$ of the entire optical fiber amplifier having a two-stage connection, as in the optical fiber amplifier 101, is represented by the following equation 1.

$$NF_{total}=NF_1+NF_2/G_1 \quad (1)$$

where $NF_1$ is the noise figure of the optical fiber amplifier 1 (e.g., 5.5 dB), $NF_2$ is the noise figure of the optical fiber amplifier 11, and $G_1$ is the gain of the first-stage amplifier (amplifier #1) (e.g., −15 dBm to +4 dBm; +19 dBm). As is known, gain is calculated by measuring $S_{out}/S_{in}$.

From the above equation 1, a value of $NF_{total}$ is provided as $NF_{total}$=5.6 dB. $NF_{total}$ is provided as 5.6 dB because $NF_2$=9 dB and thus $NF_{total}$=5.5 dB+9 dB/19 dB. Hence, from the equation above, 10*log[10^(5.5/10)+ 10^(−10/10)]=5.63 dB.

According to the first embodiment, the pumping optical output terminals of the fused-type WDMs 4 and 14 are connected together, as shown in FIG. 1. Therefore, the pumping light which could not be used up in the respective optical fibers 2 and 12 can be reused. This is a significant advantage of the invention as described below.

Specifically, the pumping efficiency at the optical fiber 2 is as small as 6% (+5 dBm/50 mW=3 mW/50 mW). Thus, even if pumping light is used for a side mode amplification of spontaneous-emission light other than the signal light or the signal light itself, almost all (e.g., about 90%, or approximately 45 mW) of the pumping light power is not used. Instead, it is outputted to the fusion-type optical combining and dividing instrument 4. Thus, the pumping light is transmitted through the instruments 4 and 14, the power thereof is reduced by the transmitting loss of the respective fusion-type WDMs (respectively, 1 dB) and a power of 28 mW(=45×10-²/₁₀) is inputted to the optical fiber 12. Specifically, the total loss of WDM 4, 14 is 2 dB (e.g., 1+1). The loss of 2 dB is equal to the ratio by 10^(-²/₁₀ mW) which is approximately 62% efficiency. Thus, 45 mW×62% gives approximately 28 mW.

Therefore, the pumping light power inputted to the optical fiber 12 becomes a total of 100 mW (=72+28) and the pumping light power approximately 1.4 times as much as the required pumping light power is provided.

Conversely, to provide the required pumping light power of 72 mW, the optical output power of the 1.48 μm pumping LD module becomes 55 mW [=(72-28)×90/72] and the pumping light power of the 1.48 μm pumping LD module can be reduced. The optical output of the 1.48 μm pumping LD module is substantially proportional to a drive current value (e.g., 300–600 mW). Thus, if the required output of the LD module is decreased, then the drive current required is also decreased. Therefore, the reduction in the required pumping light power provides an advantage of low drive current operation.

Additionally, the lower the optical output, the higher (longer) the reliability (life) of the 1.48 μm pumping LD module, thereby providing increased reliability of the 1.48 μm pumping LD module.

Meanwhile, the conversion efficiency of the erbium-doped optical fiber 12 is approximately 70%, the side-mode-amplification and spontaneous emission is about 10%, and the unused portion is approximately 20%. Thus, the pumping light power passing through the optical fiber 12 without being used is approximately 15 mW (72 mW×about 20%). This pumping light is inputted to the erbium-doped optical fiber 2 via the fused-type WDMs 14 and 4. The inputted pumping light power is attenuated by the total transmitting loss of 2 dB of the two WDMs 14 and 4, to be about 9 mW.

Therefore, the pumping light power inputted to the optical fiber 2 becomes about 69 mW (=60 mW+9 mW) in total (e.g., an increased value). Conversely, the required optical output of the 1.48 μm pumping LD module 5 for obtaining the required characteristic becomes 71 mW [=(60-9)×75/60] whereby the power can be decreased by substantially 10%.

As has been explained, the required pumping power for each of the 1.48 μm pumping LD modules is 75 mW or 90 mW (total 165 mW) when the individual optical fiber amplifiers of the two-stage optical fiber amplifying unit are only connected.

In contrast, with the optical fiber amplifying unit according to the first embodiment of the present invention, the pumping light power of approximately 70 mW or approximately 60 mW (total approximately 130 mW) is sufficient by reusing the previously unused (e.g., previously unused by the conventional optical amplifying unit) pumping light. As a result, efficiency is increased by about 20%.

Figure 14:
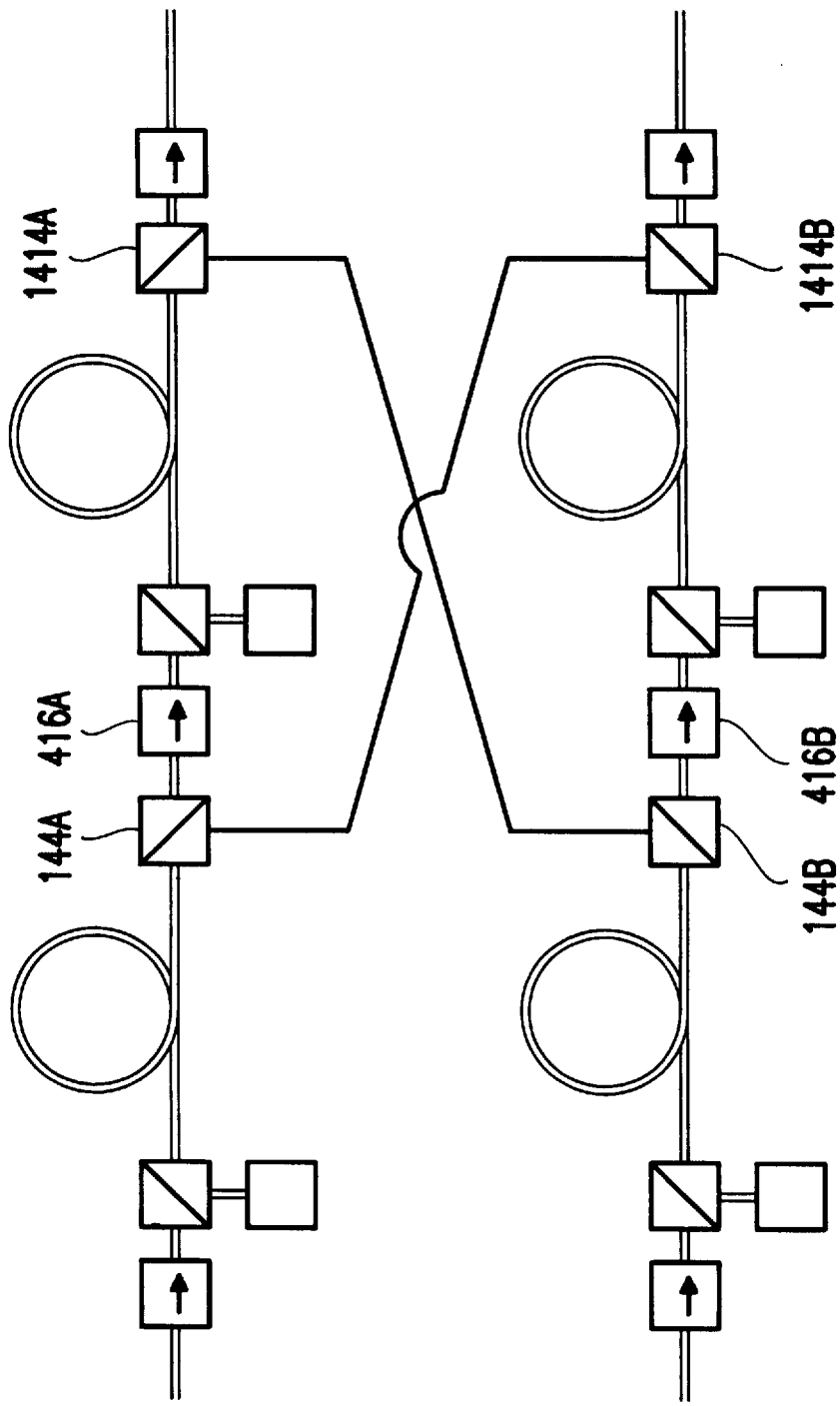

According to the conventional optical amplifying unit shown in FIG. 14, two high reflection mirrors are necessary to provide the same effect. The mirrors make the arrangement unnecessarily large, cumbersome and costly, as well as inefficient. However, in the optical fiber amplifying unit according to the present invention, the high-reflection mirrors are unnecessary.

Additionally, in the optical fiber amplifying unit having a two-stage series-connection, normally high pumping light power is required for the subsequent stage's pumping light source. As shown in FIG. 1, almost all of the pumping light power is transmitted through the first stage optical fiber amplifier without being used.

Therefore, it is more efficient to utilize the pumping light power which was unused in the first stage optical fiber amplifier, for the pumping of the second (e.g., subsequent) stage optical fiber amplifier as in the optical fiber amplifying unit 101 of the first embodiment shown in FIG. 1, than in the conventional arrangement of FIG. 14.

Hereinbelow, modifications of the first embodiment are described with reference to FIGS. 2–16. For brevity, elements in FIGS. 2–16 which are the same as those in FIG. 1 will not be discussed.

In the first embodiment of the present invention, light outputted from the erbium-doped optical fiber 2 includes spontaneously-emitting light other than the amplified signal light and the unused pumping light. If the spontaneously-emitting light outputted from the optical fiber 2 is inputted to the optical fiber 12, the energy of the excited erbium-doped optical fiber 12 also is used for the amplification of the spontaneously-emitting light other than the signal light originally to be amplified. Thus, the conversion efficiency of the optical fiber 12 is extremely decreased. This is a problem of the first embodiment of the present invention.

Figure 2:
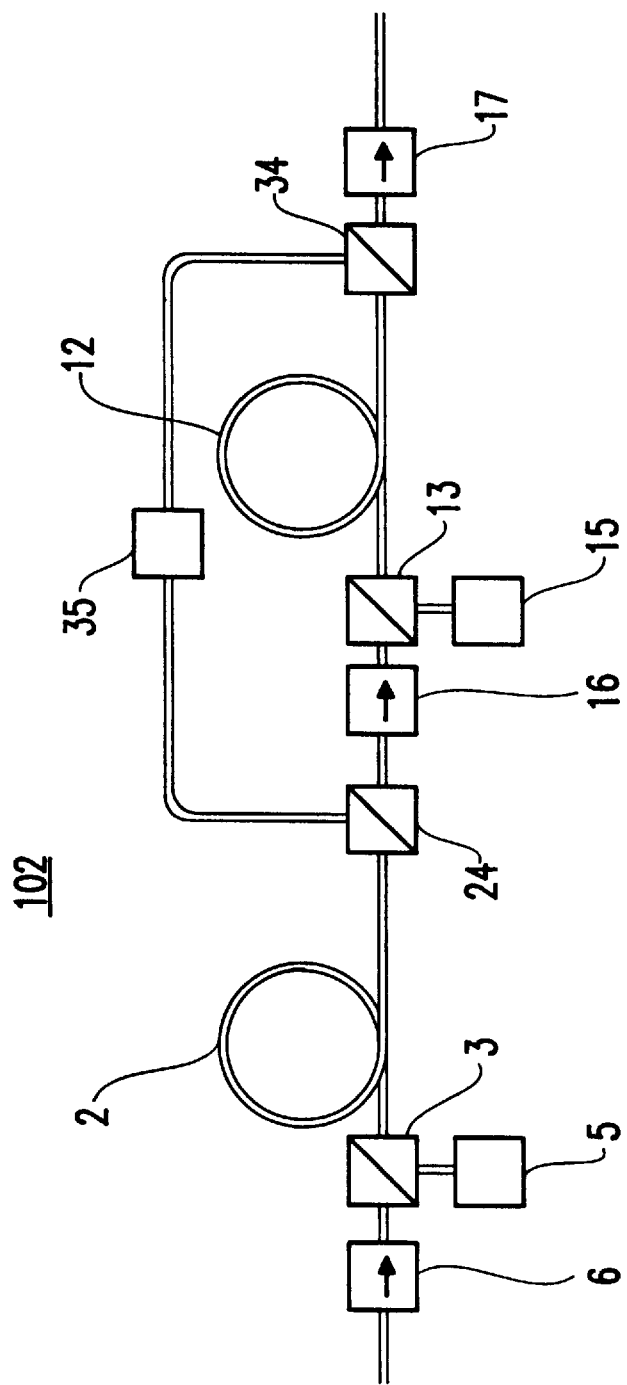
FIG. 2 illustrates an optical fiber amplifying unit 102 according to a second embodiment of the present invention.
Figure 3:
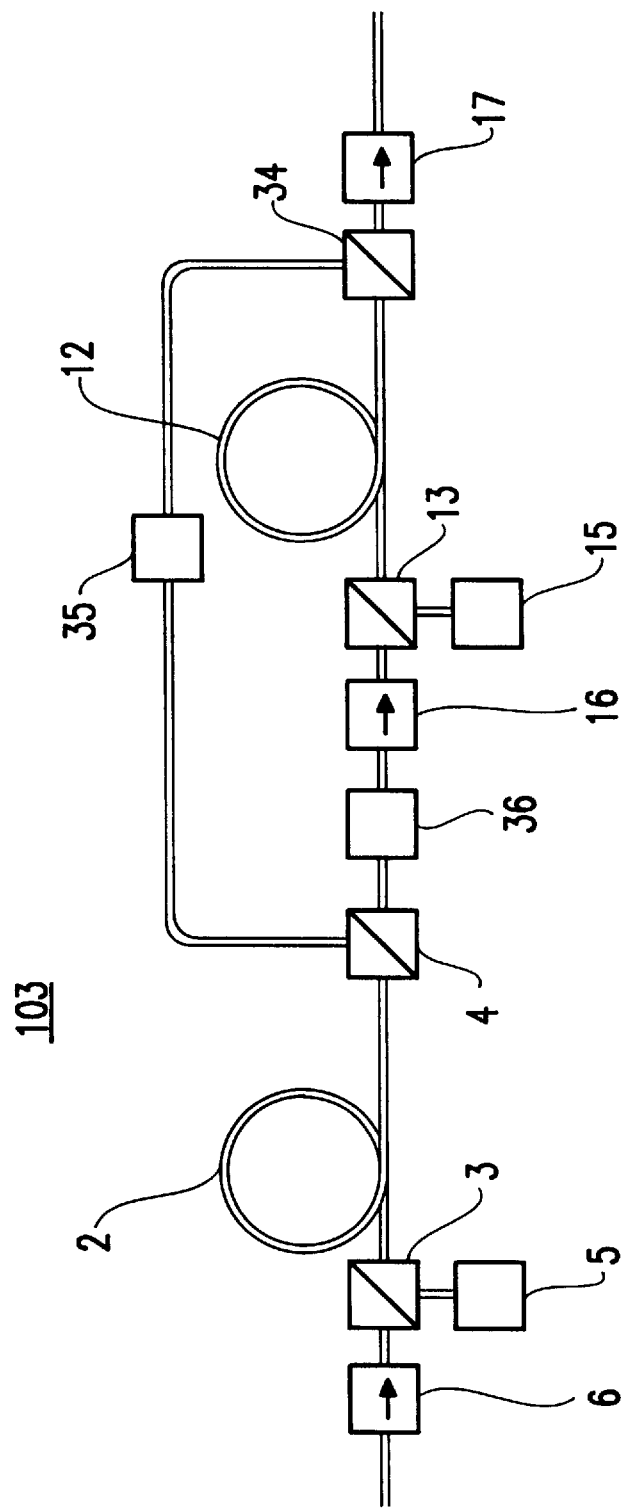
FIG. 3 illustrates an optical fiber amplifying unit 103 according to a third embodiment of the present invention.

Accordingly, in the second and third embodiments of the present invention as shown in FIGS. 2 and 3, the pumping (e.g., conversion) efficiency is maintained by blocking the spontaneously-emitting light outputted from the optical fiber amplifier 1 by an optical filter 35 arranged at the output side of the optical combining and dividing instrument 4 or between stages of the two optical fiber amplifiers. Further, as described below, the spontaneous-emission light is blocked in a path for reusing the pumping light (e.g., between WDMs 4 and 14), in the optical fiber amplifying unit 101 according to the first embodiment, and thus the problem of the first embodiment is overcome.

Turning to FIG. 2, in optical fiber amplifying unit 102 which is the second embodiment of the present invention, optical combining and dividing instruments (preferably fusion/fused-type WDMs) 24 and 34 are provided for transmitting only the signal light and for reflecting the pumping light and the spontaneous-emission light, respectively.

An optical short-pass filter 35 is provided for transmitting the pumping light and blocking the spontaneous-emission light, and is arranged in a path connecting the WDMs 24 and 34. Filter 35 preferably comprises a dielectric multi-layer film and/or a fiber Bragg grating (a fiber-fuse-type or filter-type). The advantage of this configuration is that the conversion efficiency is maintained, since the spontaneous-emission light outputted from the optical fiber amplifier 1 is blocked by the optical filter 35. Further, the spontaneous-emission light is blocked in a path for reusing the pumping light (e.g., between WDMs 24 and 34).

FIG. 3 illustrates an optical fiber amplifying unit 103, which is the third embodiment and which includes an optical bandpass filter 36 for transmitting only the signal light and for blocking the spontaneously-emitting light. Filter 36 is arranged between the WDM 4 and the polarization independent-type in-line optical isolator 16. Filter 36 preferably comprises a dielectric multi-layer film and/or a fiber Bragg grating (a fiber-fuse-type or filter-type).

Further, the optical short pass filter 35 for transmitting the pumping light and blocking the spontaneous-emission light is arranged between the WDMs 4 and 14. The conversion efficiency can be further increased by substantially 10% by adopting the configurations shown in FIGS. 2 and 3, as compared to the optical fiber amplifying unit 101 shown in FIG. 1.

For the first through third embodiments of the optical fiber amplifying unit of the present invention shown in FIGS. 1–3, all of the optical fiber amplifiers are provided with "forward pumping". Specifically, "forward pumping" refers to the directions of the signal light and the pumping light inputted to the erbium-doped optical fibers being the same.

However, as described above, the optical fiber amplifying unit of the present invention is not limited to "forward pumping", but is equally applicable to "backward pumping". "Backward pumping" is pumping in which the directions of the signal light and the pumping light inputted to the optical fibers are different. Thus, in backward pumping, the pumping light is transmitted in a direction reverse to the signal light transmission direction.

Figure 4:
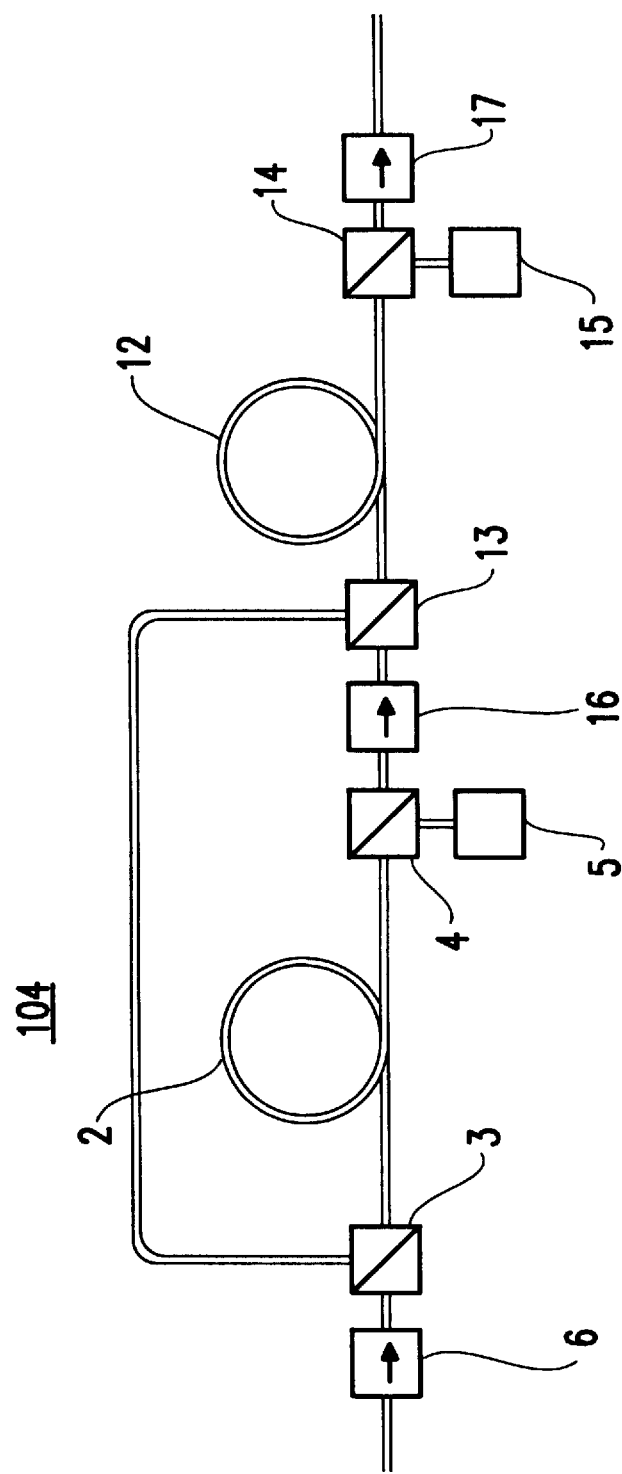
FIG. 4 illustrates an optical fiber amplifying unit 104 according to a fourth embodiment of the present invention.
Figure 5:
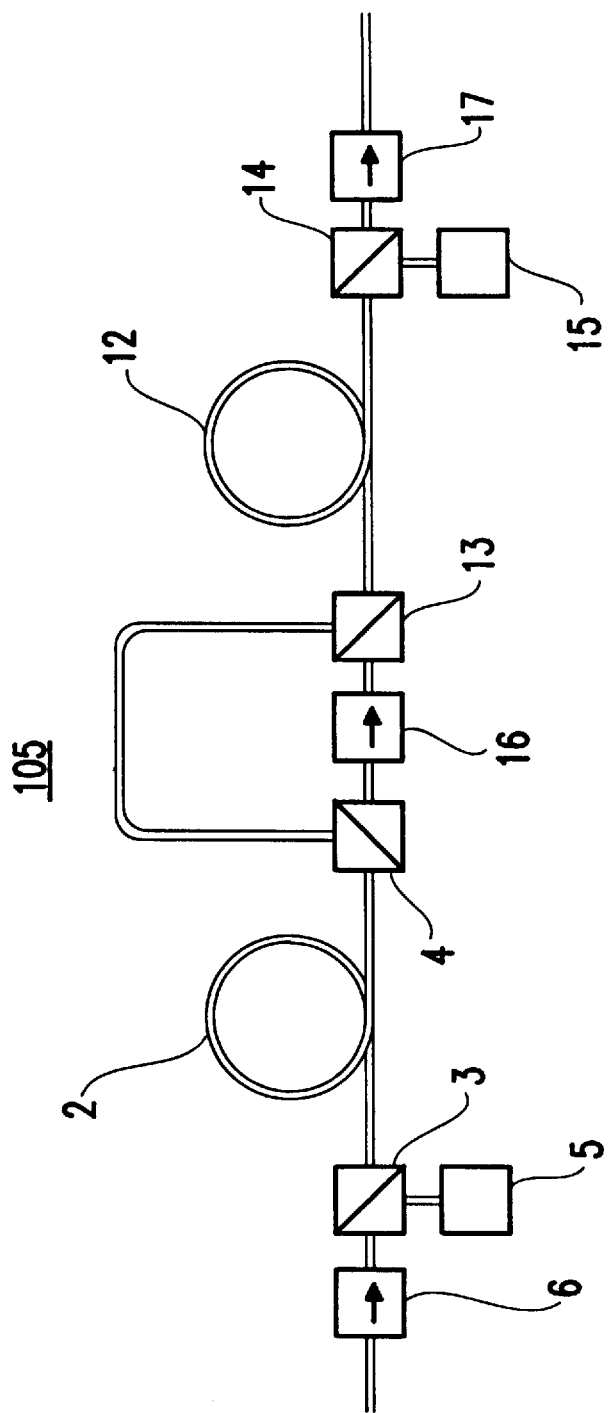
FIG. 5 illustrates an optical fiber amplifying unit 105 according to a fifth embodiment of the present invention.
Figure 6:
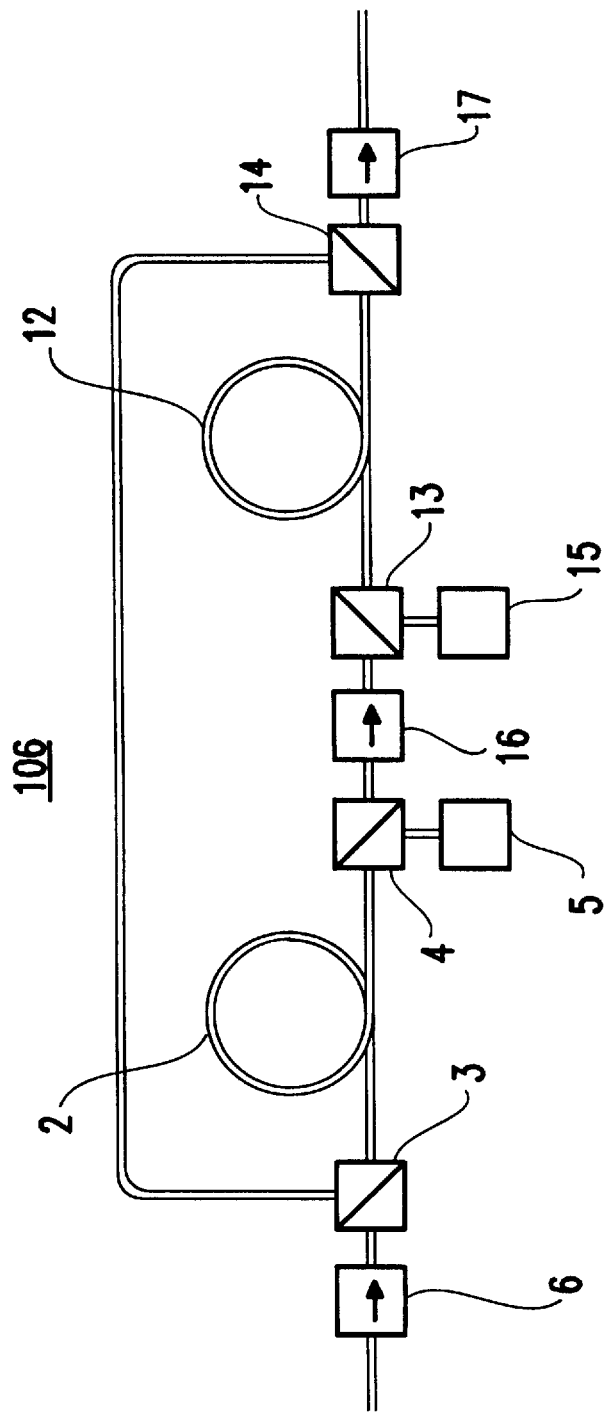
FIG. 6 illustrates an optical fiber amplifying unit 106 according to a sixth embodiment of the present invention.

Other embodiments of the invention employ "backward pumping". The arrangements of these embodiments are shown in FIGS. 4–6, respectively, as optical fiber amplifying units 104, 105 and 106.

The operation of each of the fourth through sixth embodiments which employ "backward pumping" is similar to that of the first through third embodiments, and thus for brevity will not be described here. A key difference between the fourth through sixth embodiments is that the amplifier design is different in that forward and backward pumping is employed. Typically, forward pumping results in low noise, whereas backward pumping achieves high output power.

Additionally, the optical fiber amplifying unit of the present invention is applicable to two independent optical fiber amplifiers other than being tandem-connected. Specifically, the arrangements of these embodiments are respectively shown in FIG. 7 and FIG. 8 (e.g., optical fiber amplifying units 107 and 108 being independent (parallel) -connected).

Figure 7:
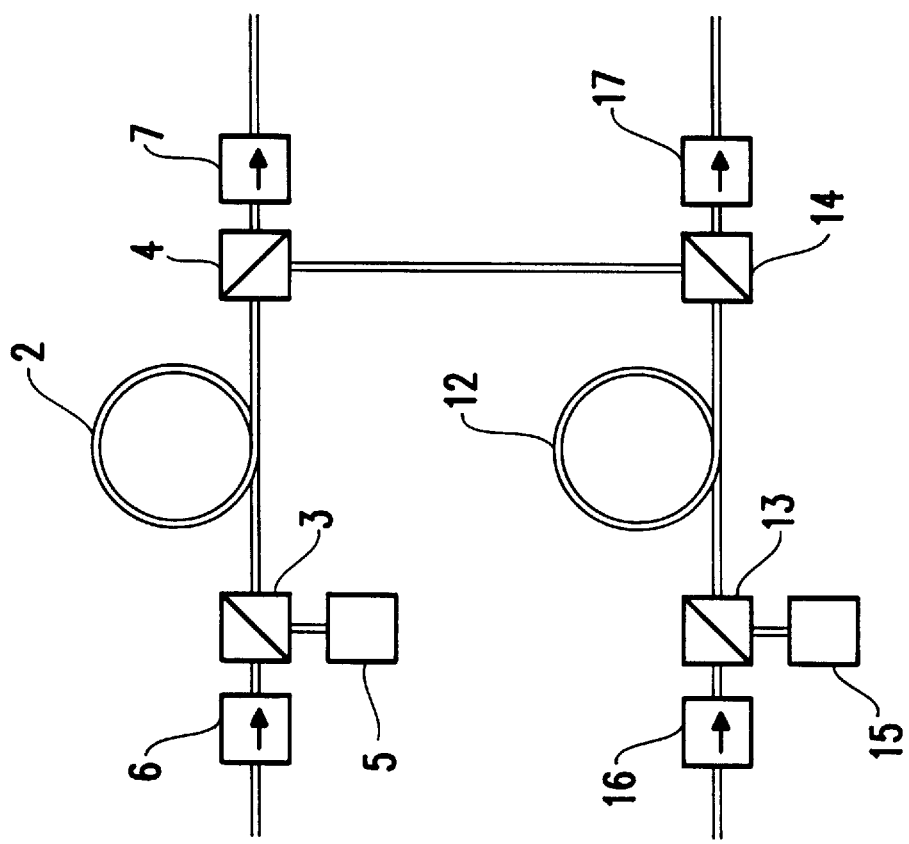
FIG. 7 illustrates an optical fiber amplifying unit 107 according to a seventh embodiment of the present invention.
Figure 8:
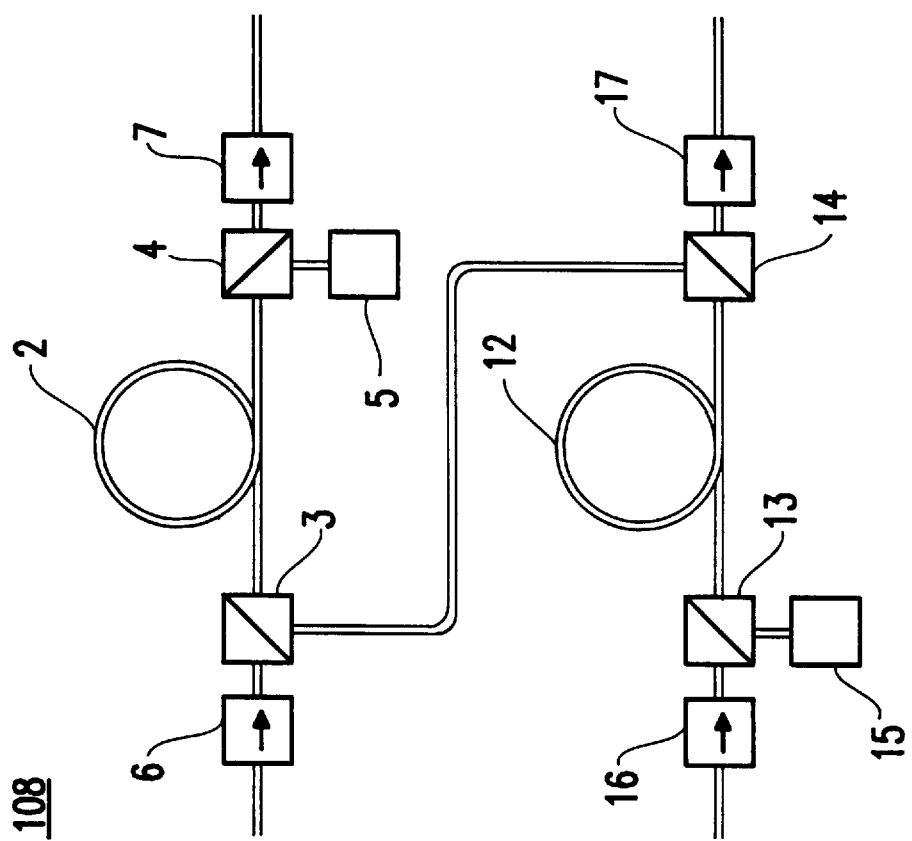
FIG. 8 illustrates an optical fiber amplifying unit 108 according to an eighth embodiment of the present invention.

Briefly, FIGS. 1–6 illustrate a two-stage amplifier unit having one signal input port and one signal-output port. FIGS. 7–8 illustrate arrangements in which two single-stage amplifiers are connected by an optical fiber. Thus, these arrangements have two signal-input ports and two signal-output ports. More specifically, FIGS. 7 and 8 utilize upper and lower "lines" which are independent. These lines can be used for different applications. For example, the lines can be used for submarine/underwater optical repeaters and for two-way communication.

Further, the embodiments above have been directed to a combination of two optical fiber amplifiers in which the WDMs are arranged at both ends of the rare-earth-doped optical fiber.

Figure 9:
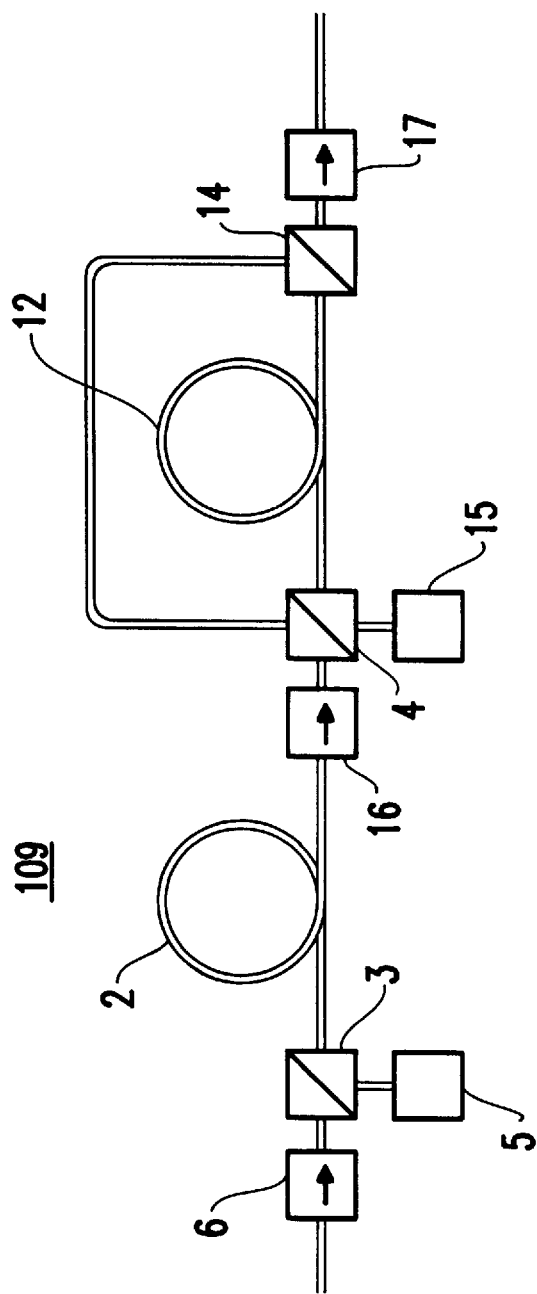
FIG. 9 illustrates an optical fiber amplifying unit 109 according to a ninth embodiment of the present invention.
Figure 10:
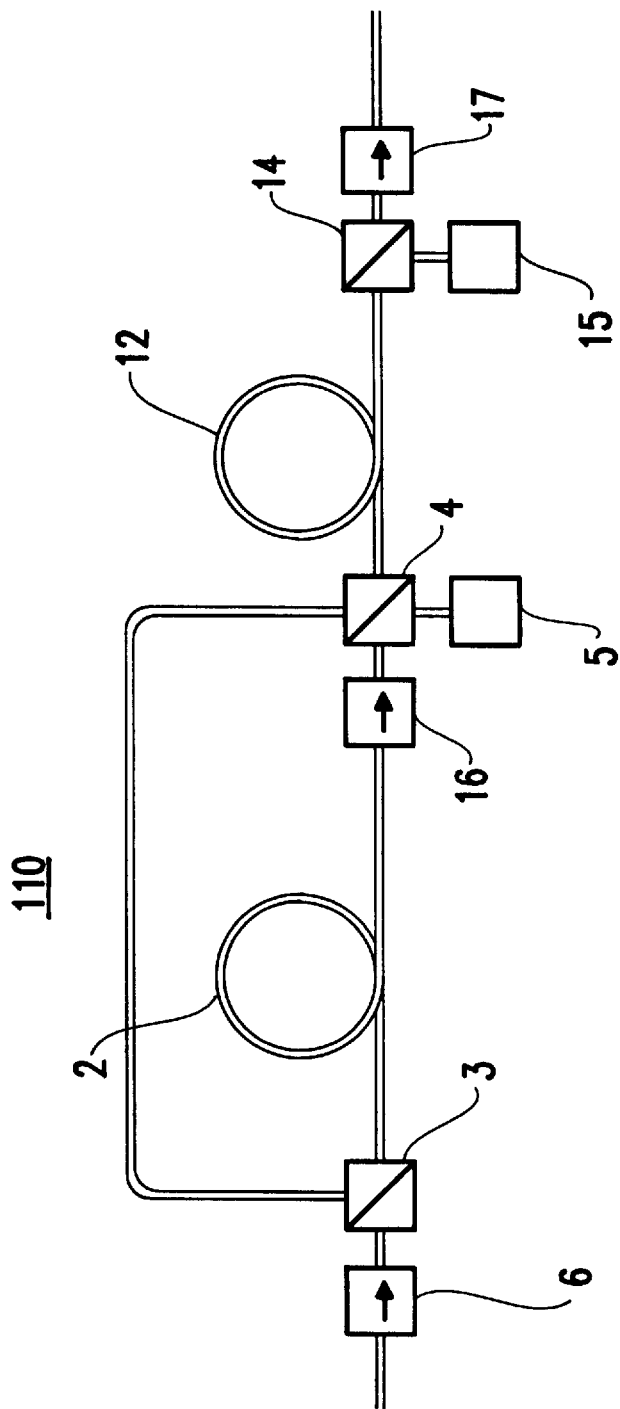
FIG. 10 illustrates an optical fiber amplifying unit 110 according to a tenth embodiment of the present invention.

However, an optical fiber amplifying unit according to the ninth and tenth embodiments of the present invention as shown in FIG. 9 and FIG. 10., respectively, two WDMs between two rare-earth doped optical fibers are combined, and the combined instrument can both input the pumping light and output the pumping light.

Specifically, FIG. 9 illustrates an optical fiber amplifying unit 109 having a two-stage structure under the "forward pumping" arrangement.

In contrast, FIG. 10 illustrates a two-stage optical fiber amplifying unit 110 having a "backward pumping" arrangement. Obviously, the arrangement in which an optical filter for blocking spontaneous-emission light is inserted between the WDM outputting the pumping light and the erbium-doped optical fiber, and the arrangement of an optical short-pass filter blocking spontaneous-emission light between the WDMs outputting the unused pumping light, are applicable to the optical fiber amplifying units of the ninth and tenth embodiments illustrated in FIG. 9 and FIG. 10. Briefly, FIG. 9 is similar to the configuration of FIG. 1. However, in FIG. 9 the WDM 4 of FIG. 1 is omitted. Thus, the number of modules is reduced in comparison to FIG. 1.

Further, the configuration of FIG. 10 is similar to that of FIG. 4. In FIG. 10 (as well as FIG. 4), the WDM 13 of FIG. 1 is omitted, and thus has fewer components than the configuration of FIG. 1. Further, in FIG. 10, the positioning of the LD 5 and WDM 4 relative to the in-line isolator 16 is reversed to that of FIG. 4.

Additionally, the arrangements of FIGS. 9–10 employ the isolators 6, 16, before the WDM 4 and LD 5 for low loss in transmitting signal and reverse pumping light. Further, in the arrangements of FIGS. 9–10 (as well as FIGS. 11–12 discussed below) which utilize the midway (intermediate) in-line isolator, the following characteristics as set forth in Table 1 are found:

TABLE 1

Figure 11:
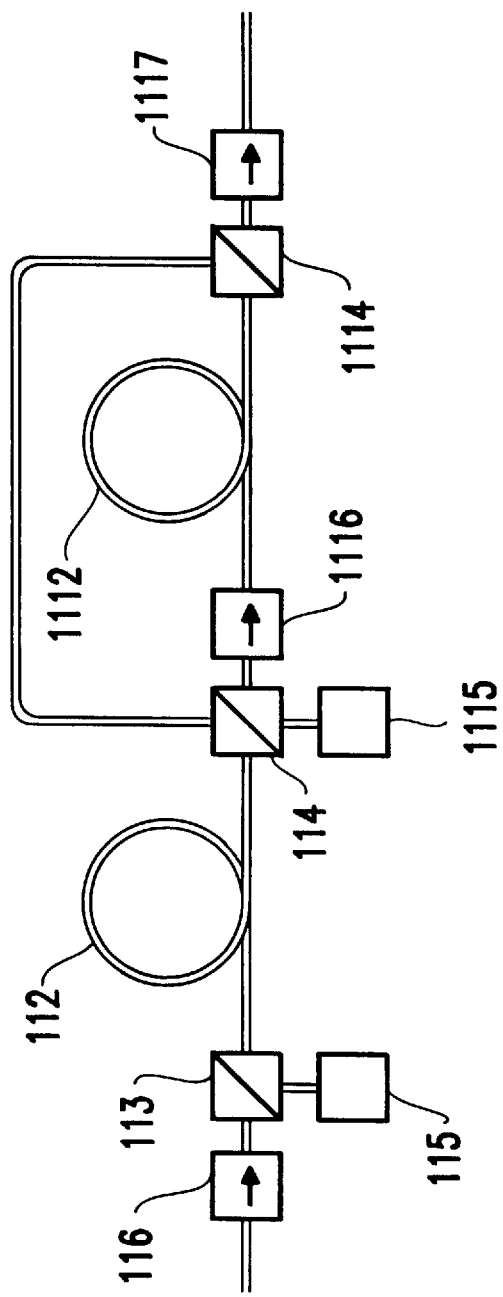
FIGS. 11 and 12 illustrate additional embodiments of a single level, two-stage optical fiber amplifier unit of the present invention incorporating a midway in-line optical isolator.
Figure 12:
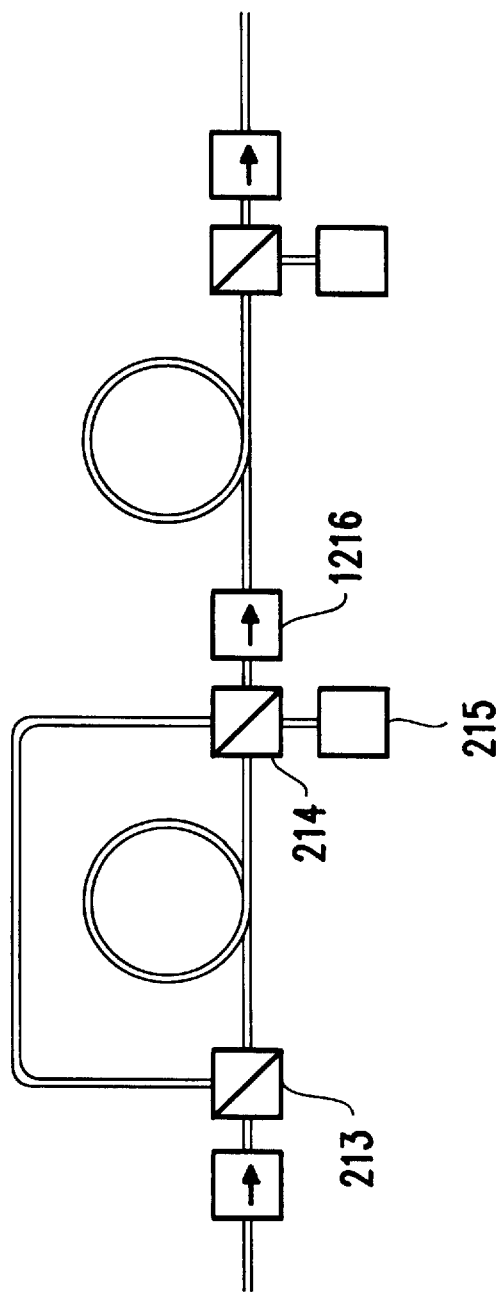

| Direction | Wavelength | Loss-FIG. 9 | Loss-FIG. 10 | Loss-FIG. 11 | Loss-FIG. 12 |
|---|---|---|---|---|---|
| Transmission | Signal | low | low | low | low |
| " | pumping | low | not limited | low | low |
| Reverse | signal | high | high | high | high |
| " | pumping | low | low | not limited | low |

Thus, the configurations of FIGS. 9–10 (as well as the configuration of FIGS. 11–12 discussed below also utilizing a midway in-line isolator) are meritorious in that the pumping light has a low loss and there is no limitation on the output power. Thus, the midway in-line isolator is important for producing low loss for the signal and pumping in the transmission direction.

Numerous other configurations which employ the midway optical in-line isolator are also possible. For example, further embodiments are shown in FIGS. 11–16.

As mentioned above, the configuration of FIGS. 11 and 12 include an arrangement in which a two-stage amplifier unit is provided including a midway optical isolator.

Specifically, FIG. 11 has an in-line optical isolator 161 in the second stage amplifier after a WDM 114/LD 1115 arrangement. A fiber connects a WDM 1114 with WDM 114.

FIG. 12 has an in-line optical isolator 1216 in the second stage amplifier after a WDM 214/LD 215 arrangement. A fiber connects a WDM 213 with WDM 214.

Figure 13:
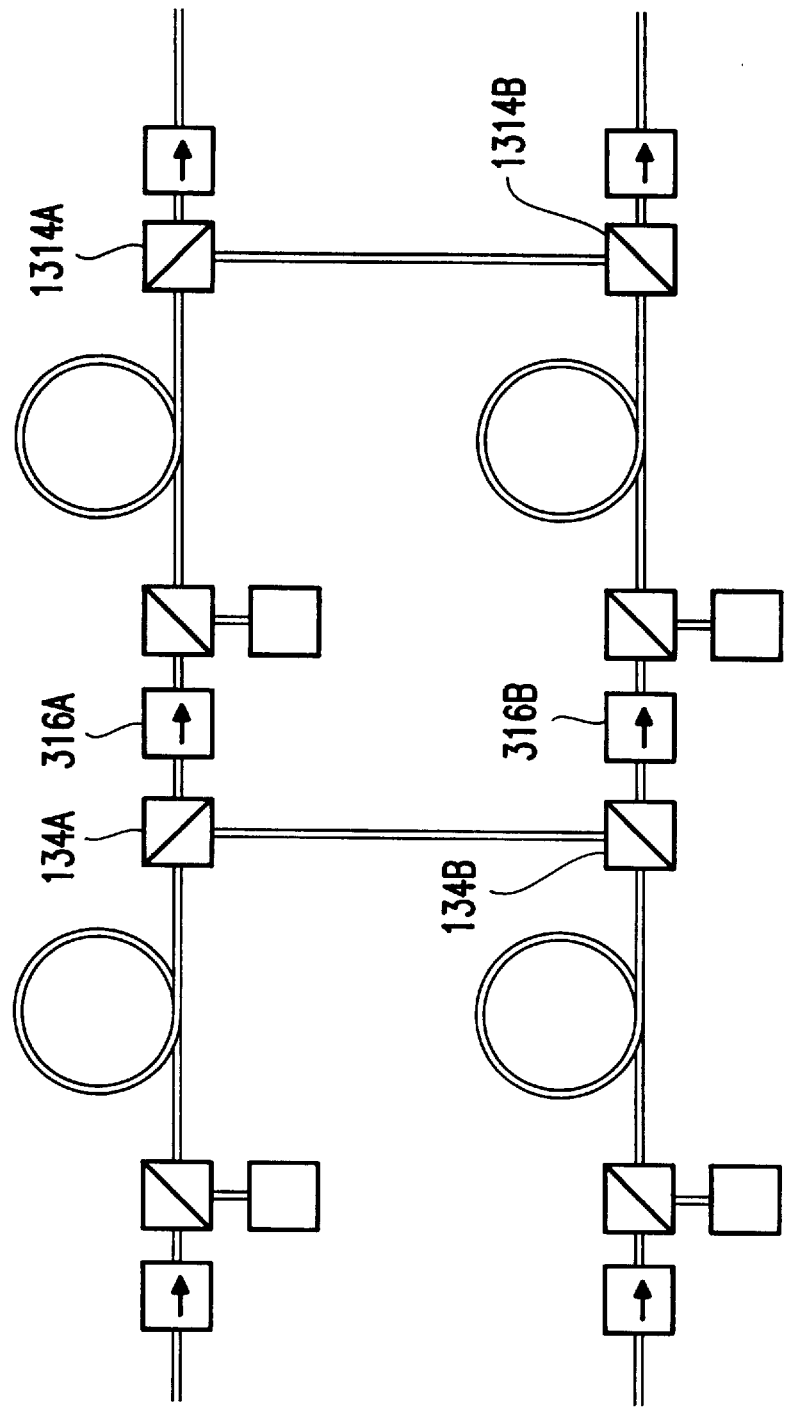
FIGS. 13–16 illustrate exemplary embodiments of two-level, two-stage optical fiber amplifier units utilizing optical in-line isolators.

FIG. 13 is a hybrid (e.g., combination) of the configurations of FIGS. 7 and 8 in which two lines are provided independently from one another and in which each line has two-stages. This system would be preferably used for bidirectional communication. The upper line is connected to the lower line through the upper line's intermediate WDM 134A being connected to the lower line's intermediate WDM 134B and the upper line's latter stage WDM 1314A being connected to the lower line's latter stage WDM 1314B. A midway in-line optical isolator 316A, 316B is provided respectively in the upper and lower line. While the system is shown, for example, in the forward direction, it could be used advantageously for either forward and/or reverse directions. There are four pumping sources, with each of the pumping light wavelengths being substantially equal for greatest efficiency and operability, and the LDs can be used for the upper and lower fibers.

FIG. 14 illustrates another embodiment in which two lines are provided independently from one another and in which each line has two-stages. This system also could be tailored for bidirectional communication. The upper line is connected to the lower line through the upper line's intermediate WDM 144A being connected to the lower line's latter stage WDM 1414B and the upper line's latter stage WDM 1414A being connected to the lower line's intermediate WDM 1414B. A midway in-line optical isolator 416A, 416B is provided respectively in the upper and lower line. While the system is shown, for example, in the forward direction, it could be used advantageously for either forward and/or reverse directions. There are four pumping sources, with each of the pumping light wavelengths being substantially equal for greatest efficiency and operability, and the LDs can be used for the upper and lower fibers.

Figure 15:
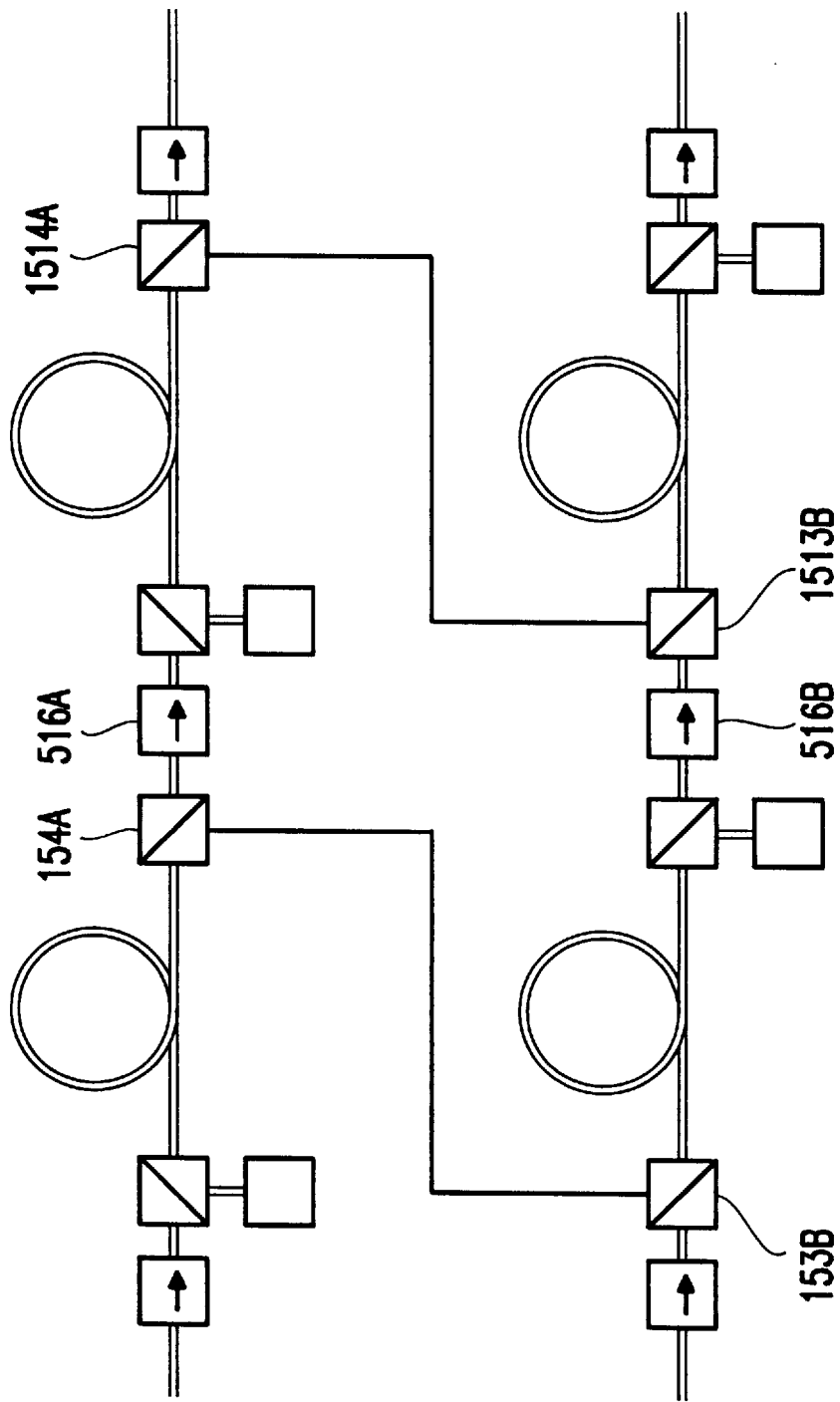

FIG. 15 illustrates another embodiment in which two lines are provided independently from one another and in which each line has two-stages. This system also could be tailored for bidirectional communication. The upper line is connected to the lower line through the upper line's intermediate WDM 154A being connected to the lower line's first WDM 153B (e.g., before the first stage's WDM/LD arrangement) and the upper line's latter stage WDM 1514A being connected to the lower line's WDM 1513B. A midway in-line optical isolator 516A, 516B is provided respectively in the upper and lower line. While the system is shown, for example, in the forward direction, it could be used advantageously for either forward and/or reverse directions. There are four pumping sources, with each of the pumping light wavelengths being substantially equal for greatest efficiency and operability, and the LDs can be used for the upper and lower fibers.

Figure 16:
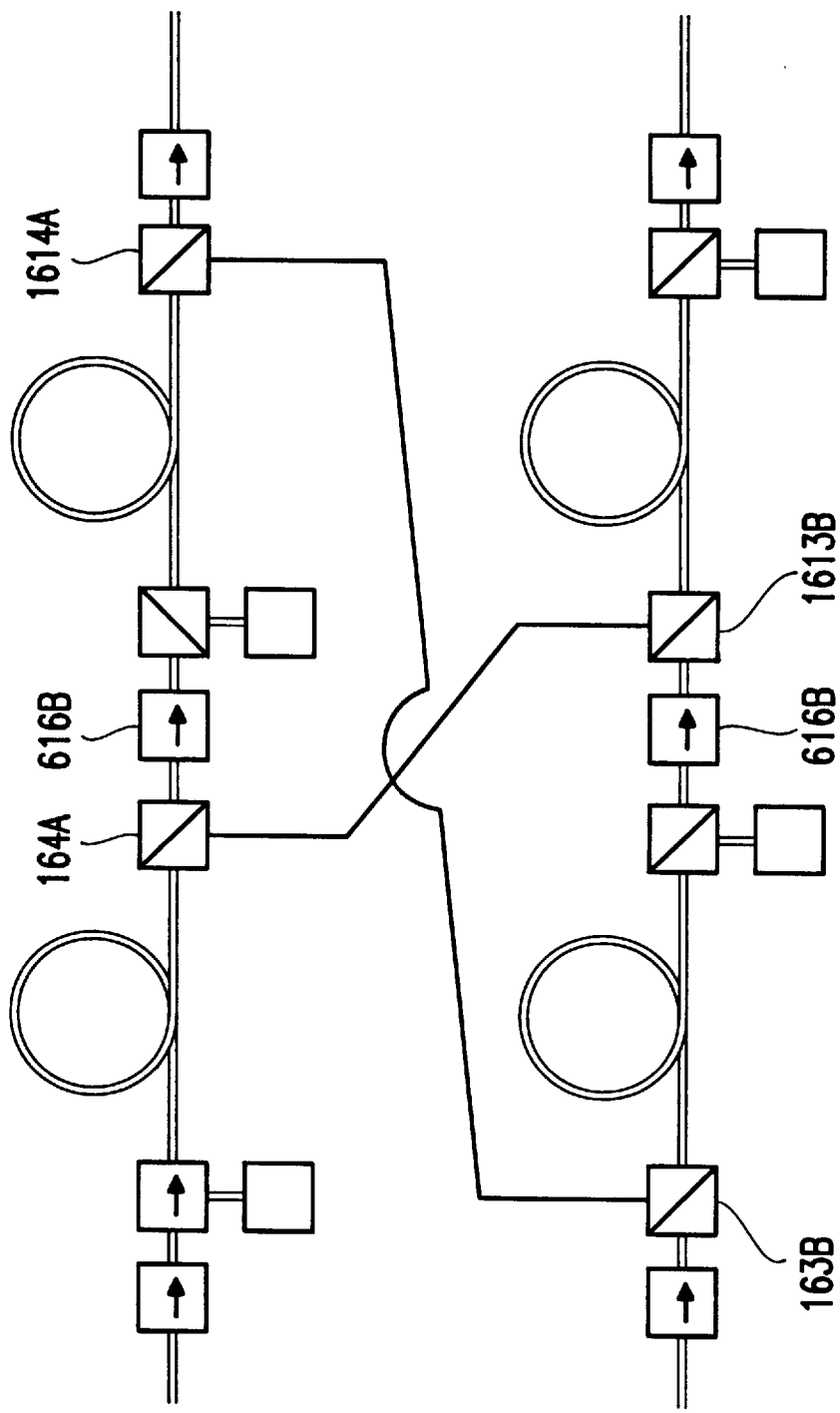
Figure 17:
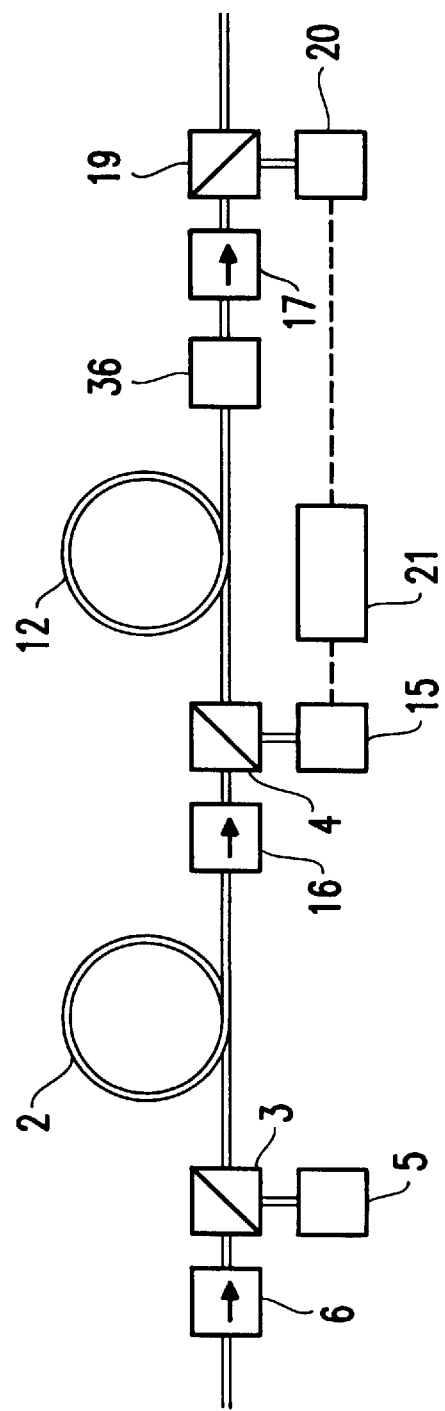
FIGS. 17–21 respectively illustrate first through fifth conventional optical fiber amplifying units.
Figure 18:
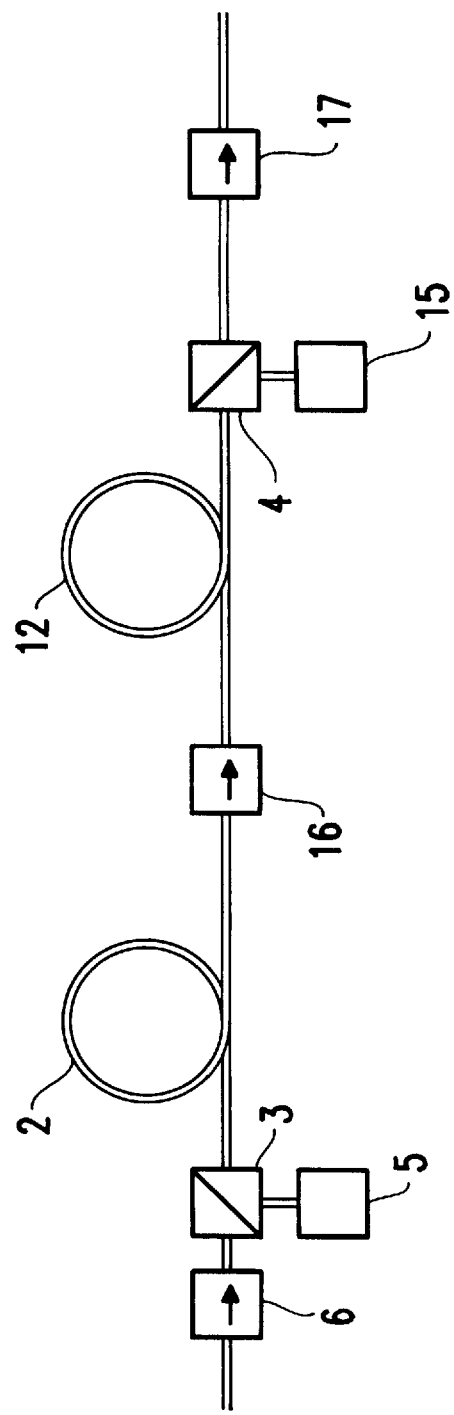
Figure 19:
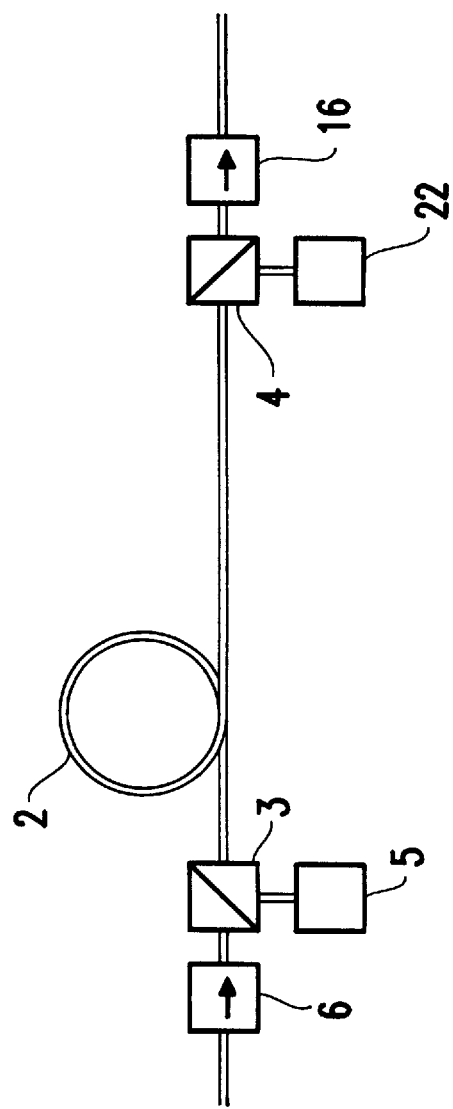
Figure 20:
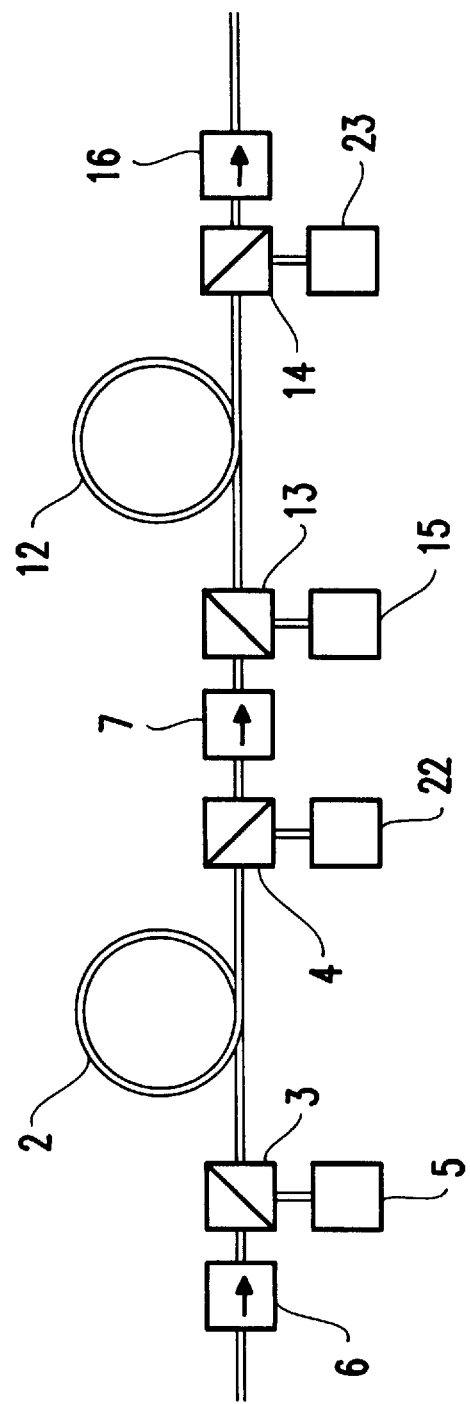
Figure 21:
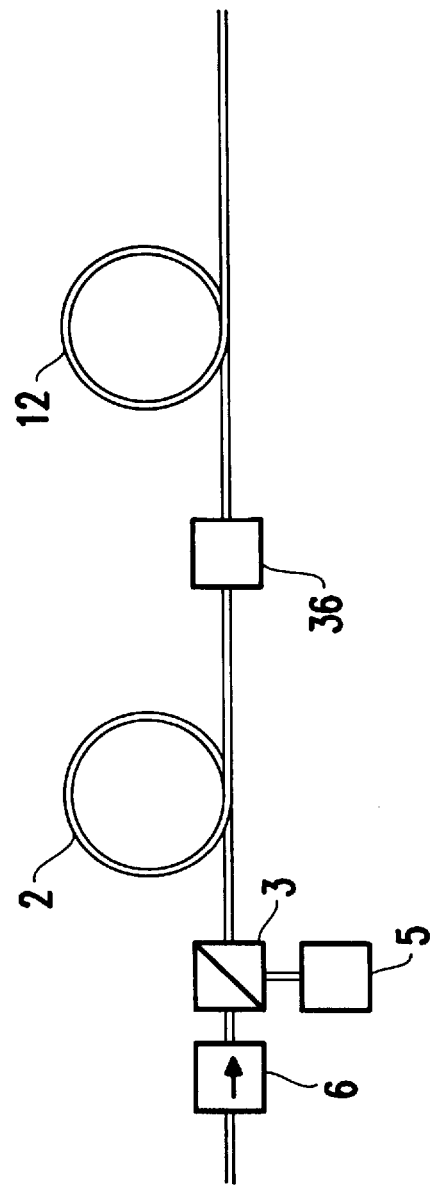

FIG. 16 illustrates yet another embodiment in which two lines are provided independently from one another and in which each line has two-stages. The upper line is connected to the lower line through the upper line's intermediate WDM 164A being connected ahead to the lower line's third WDM 1613B (e.g., after the first stage's WDM/LD arrangement and after the in-line isolator 616B) and the upper line's latter WDM 1614A being connected behind to the lower line's WDM 163B. A midway in-line optical isolator 616A is provided after the second WDM 164A in the upper line.

While the system is shown, for example, in the forward direction, it could be used advantageously for either forward and/or reverse directions, and could be tailored for bidirectional communication. There are four pumping sources, with each of the pumping light wavelengths being substantially equal for greatest efficiency and operability, and the LDs can be used for the upper and lower fibers.

Thus, each of the above embodiments provides a different configuration/combination of a two-line system, each line having a two-stage amplifier unit, and a pumping direction (e.g., forward pumping path or backward pumping path) as set forth in Table 2 below:

TABLE 2

| UPPER | LEVEL | LOWER | LEVEL |
|---|---|---|---|
| 1st Amp. Stage | 2nd Amp. Stage | 1st Amp. stage | 2nd Amp. Stage |
| F | F | F | F |
| F | F | F | B |
| F | F | B | F |
| F | F | B | B |
| F | B | F | B |
| F | B | B | F |
| F | B | B | B |
| B | F | B | B |
| B | F | B | F |
| B | B | B | B |

Thus, there are twenty (e.g., 10×2) different combinations formed by the upper/lower level, two-stage amplifiers and the pumping directions.

Generally, LDs can be used for upper and lower branches (e.g., levels). Pumping sources on the same level may have different wavelengths, whereas pumping wavelengths on upper and lower levels of the first stage (or the second stage) must be the same.

As described above, the optical fiber amplifying unit according to the present invention allows pumping light which could not be used in the two optical fiber amplifiers, respectively, to be reused mutually in the optical fiber amplifiers, by connecting the pumping light via the optical combining and dividing instruments. As a result, the conversion efficiency is promoted, the pumping light source can be operated by a low drive current, and reliability is increased.

Further, with the invention, the high-reflection mirrors of the conventional units are not required, the number of parts is not considerably increased, and the conversion efficiency is increased since the pumping light is reused via the optical combining and dividing instruments.

Thus, the inventive structures increase conversion efficiency and thereby achieve low current of a pumping light source, increased gain, and high output in an optical fiber amplifying unit having a two-stage configuration or independent two-direction transmission.

While the invention has been described in terms of the above preferred embodiments, those skilled in the art will recognize that the invention can be practiced with modification within the spirit and scope of the appended claims.

For example, while an erbium-doped fiber is preferred, other rare-earth doped fibers may also be employed. When erbium-doped fiber is used for the rare-earth doped optical fiber in the optical fiber amplifying unit, the first pumping wavelength and the second pumping wavelength may have a wavelength of substantially 1.48 $\mu$m and the first signal light may have a wavelength of substantially 1.55 $\mu$m.

Further, the first pumping light outputting device and the second pumping light outputting device may comprise semiconductor lasers, the first optical combiner and the second optical combiner may comprise fused-type fiber optical combiners and similarly, the optical divider and the optical combiner may comprise fused-type fiber optical combiners. Alternatively, the above elements may comprise interference film filter-type optical combiners.

Additionally, other combinations of the structures shown in FIGS. 1–16 are possible to be adapted.

Having thus described my invention, what I claim as new and desire to secure by letters patent is as follows:

1. An optical fiber amplifying device, comprising:
   first and second optical fiber amplifiers, said first optical fiber amplifier including:
   a first amplifying fiber in which a first signal light having a first signal wavelength is inputted and a pumping light is applied from an external source, thereby outputting the first signal light after amplifying the first signal light;
   a first pumping light outputting means for outputting a first pumping light having a first pumping wavelength and exciting the first optical fiber amplifier; and
   a first optical coupler for coupling the first pumping light to the first amplifying fiber, said first amplifying fiber outputting a first amplified signal light by amplifying the first signal light;
   said second optical fiber amplifier including:
   a second amplifying fiber in which a second signal light having a second signal wavelength is inputted and a pumping light is applied from an external source, thereby outputting the second signal light after amplifying the second signal light;
   a second pumping light outputting means for outputting a second pumping light having a second pumping wavelength substantially the same as that of the first pumping wavelength;

a second optical coupler for outputting the second pumping light to said second amplifying fiber, said second optical fiber amplifier outputting a second amplified signal light by amplifying the second signal light;

an optical divider for outputting a divided pumping light by dividing the second pumping light from the second amplified signal light; and a divided pumping light coupler for coupling the divided pumping light to the first optical fiber amplifier.

2. An optical fiber amplifying device according to claim 1, wherein said first amplifying fiber and said second amplifying fiber comprise a first rare-earth doped optical fiber and a second rare-earth doped optical fiber, respectively.

3. An optical fiber amplifying device according to claim 2, wherein said second optical fiber amplifier is connected to the first optical amplifier in series, and wherein said first amplified signal light is inputted to the second rare-earth doped optical fiber as the second amplified signal light in the second optical fiber amplifier.

4. An optical fiber amplifying device according to claim 3, wherein said first optical coupler is arranged at an input side of the first rare-earth doped optical fiber, and said second optical coupler is arranged at an input side of the second rare-earth doped optical fiber, wherein said optical divider is arranged at an output side of the second rare-earth doped optical fiber, and said divided pumping light coupler is arranged between the first rare-earth doped optical fiber and the second optical coupler.

5. An optical fiber amplifying device according to claim 1, wherein said first optical fiber amplifier further includes:

a first optical isolator arranged opposed to the first amplifying fiber with respect to the first optical coupler for transmitting light only in a first direction of the first signal light and blocking light in a second direction reverse to that of said first direction, wherein said second optical fiber amplifier further includes:

a first optical isolator opposed to the second amplifying fiber with respect to the optical divider for transmitting the second amplified signal light and blocking light in a direction reverse thereto; and a second optical isolator arranged between the divided pumping light coupler and the second amplifying fiber for transmitting light only in said first direction of the first signal light and blocking light in said second direction.

6. An optical fiber amplifying device according to claim 1, wherein said first optical coupler is arranged at an output side of the first amplifying fiber, and said second optical coupler is arranged at an output side of said second amplifying fiber, and wherein said optical divider is arranged between the first optical coupler and the second amplifying fiber, and said divided pumping light coupler is arranged at an input side of the first amplifying fiber.

7. An optical fiber amplifying device according to claim 6, wherein said first optical fiber amplifier further includes a first optical isolator arranged opposed to said first amplifying fiber with respect to the divided pumping light coupler for transmitting said first signal light and blocking light in a reverse direction thereto, wherein said second optical fiber amplifier further includes:

a first optical isolator arranged opposed to the second amplifying fiber with respect to said second optical coupler for transmitting said second amplified signal light and blocking light in a reverse direction thereto; and a second optical isolator arranged between said first optical coupler and the optical divider for transmitting the first amplified signal light and blocking light in a reverse direction thereto.

8. An optical fiber amplifying device according to claim 1, wherein said first optical coupler is arranged at an input side of said first amplifying fiber, and said second optical coupler is arranged at an output side of said second amplifying fiber, and wherein said optical divider is arranged at an input side of said second amplifying optical fiber, and said divided pumping light coupler is arranged between an output side of said first amplifying fiber and said optical divider.

9. An optical fiber amplifying device according to claim 8, wherein said first optical fiber amplifier further includes a first optical isolator arranged opposed to said first amplifying fiber with respect to said first optical coupler for transmitting light only in a first direction of said first signal light and blocking light in a second direction, said second direction being reverse to that of said first direction, wherein said second optical fiber amplifier further includes:

a first optical isolator arranged opposed to said second amplifying fiber with respect to said second optical coupler for transmitting said second amplified signal light and blocking light in a reverse direction thereto; and a second optical isolator arranged between said divided pumping light coupler and said optical divider for transmitting said first amplified signal light and blocking light in said reverse direction.

10. An optical fiber amplifying device according to claim 1, wherein said first optical coupler is arranged at an output side of said first amplifying fiber, and said second optical coupler is arranged at an input side of said second amplifying fiber, and wherein said optical divider is arranged at an output side of said second amplifying fiber, and said divided pumping light coupler is arranged at an input side of said first amplifying fiber.

11. An optical fiber amplifying device according to claim 10, wherein said first optical fiber amplifier further includes a first optical isolator arranged opposed to said first amplifying fiber with respect to said divided pumping light coupler for transmitting said first signal light and blocking light in a reverse direction thereto, wherein said second optical fiber amplifier means further includes:

a third optical isolator arranged opposed to said second amplifying fiber with respect to said optical divider for transmitting said second amplified signal light and blocking light in a reverse direction thereto; and a fourth optical isolator arranged between said first optical coupler and said second optical coupler for transmitting said second signal light and blocking light in a reverse direction thereto.

12. An optical fiber amplifying device according to claim 2, wherein said first optical coupler is arranged at an input side of said first rare-earth doped optical fiber, and said second optical coupler is arranged at an input side of said second rare-earth doped optical fiber, and wherein said optical divider is arranged at an output side of said second rare-earth doped optical fiber, and said divided pumping light coupler is arranged between said first rare-earth doped optical fiber and said second optical coupler.

13. An optical fiber amplifying device according to claim 12, wherein said first optical fiber amplifier further includes:
a first optical isolator arranged opposed to said first rare-earth doped optical fiber with respect to said first optical coupler for transmitting said first signal light and blocking light in a reverse direction thereto; and
a second optical isolator arranged opposed to said first rare-earth doped optical fiber with respect to said divided pumping light coupler for transmitting said first amplified signal light and blocking light in a reverse direction thereto,
wherein said second optical fiber amplifier further includes:
a third optical isolator arranged between said divided pumping light coupler and said second rare-earth doped optical fiber for transmitting light only in a direction of said second signal light and blocking light in a reverse direction thereto; and
a fourth optical isolator arranged at an output side of said optical divider for transmitting the second amplified signal light and blocking light in a reverse direction thereto.

14. An optical fiber amplifying device according to claim 2, wherein said first optical coupler is arranged at an output side of said first rare-earth doped optical fiber, and said second optical coupler is arranged at an output side of said second rare-earth doped optical fiber, and
wherein said optical divider is arranged between said first optical coupler and said second rare-earth doped optical fiber, and said divided pumping light coupler is arranged at an input side of said first rare-earth doped optical fiber.

15. An optical fiber amplifying device according to claim 14, wherein said first optical fiber amplifier further includes:
a first optical isolator arranged opposed to said first rare-earth doped optical fiber with respect to said divided pumping light coupler for transmitting said first signal light and blocking light in a reverse direction thereto; and
a second optical isolator arranged opposed to said first rare-earth doped optical fiber with respect to said first optical coupler for transmitting said first amplified signal light and blocking light in a reverse direction thereto, and
wherein said second optical fiber amplifier further includes:
a third optical isolator arranged opposed to said second rare-earth doped optical fiber with respect to said second optical coupler for transmitting said second amplified light and blocking light in a reverse direction thereto; and
a fourth optical isolator arranged opposed to said second rare-earth doped optical fiber with respect to said optical divider for transmitting said second amplified signal light and blocking light in a reverse direction thereto.

16. An optical fiber amplifying device according to claim 2, wherein said first optical coupler is arranged at an input side of said first rare-earth doped optical fiber, and said second optical coupler is arranged at an output of the second rare-earth doped optical fiber, and wherein said optical divider is arranged at an input side of said second rare-earth doped optical fiber, and said divided pumping light coupler is arranged between an output side of said first rare-earth doped optical fiber and said optical divider.

17. An optical fiber amplifying device according to claim 16, wherein said first optical fiber amplifier further includes:
a first optical isolator arranged opposed to said first rare-earth doped optical fiber with respect to said first optical coupler for transmitting said first signal light and blocking light in a reverse direction thereto; and
a second optical isolator arranged opposed to said first rare-earth doped optical fiber in respect of said divided pumping light coupler for transmitting said first amplified signal light and blocking light in a reverse direction thereto, and
wherein said second optical fiber amplifier further includes:
a third optical isolator arranged opposed to said second rare-earth doped optical fiber with respect to said second optical coupler for transmitting said second amplified signal light and blocking light in a reverse direction thereto; and
a fourth optical isolator arranged between said first optical coupler and the optical divider for transmitting said first amplified signal light and blocking light in a reverse direction thereto.

18. An optical fiber amplifying device according to claim 2, wherein said first optical coupler is arranged at an output side of said first rare-earth doped optical fiber, and said second optical coupler is arranged at an input side of said second rare-earth doped optical fiber, and
wherein said optical divider is arranged at an output side of said second rare-earth doped optical fiber, and said divided pumping light coupler is arranged at an input side of said first rare-earth doped optical fiber.

19. An optical fiber amplifying device according to claim 18, wherein said first optical fiber amplifier further includes:
a first optical isolator arranged opposed to said first rare-earth doped optical fiber with respect to said divided pumping light coupler for transmitting said first signal light and blocking light guided in a reverse direction; and
a second optical isolator arranged opposed to said first rare-earth doped optical fiber with respect to said first optical coupler for transmitting said first amplified signal light and blocking light guided in a reverse direction,
wherein said second optical fiber amplifier means further includes:
a third optical isolator arranged opposed to said second rare-earth doped optical fiber with respect to said optical divider for transmitting the second amplified signal light and blocking light guided in a reverse direction; and
a fourth optical isolator arranged opposed to said second rare-earth doped optical fiber with respect to said second optical coupler for transmitting said second signal light and blocking light guided in a reverse direction.

20. An optical fiber amplifying device according to claim 4, wherein said second optical coupler and said divided pumping light coupler comprise an integrated structure.

21. An optical fiber amplifying device according to claim 14, wherein said first optical coupler and said optical divider comprise an integrated structure.

22. An optical fiber amplifying device according to claim 12, wherein said divided pumping light guide includes a filter for blocking said second amplified signal light exciting light and for selectively transmitting said second pumping light.

23. An optical fiber amplifying device according to claim 4, wherein said divided pumping light guide includes a filter for blocking said second amplified signal light exciting light and for selectively transmitting said second pumping light.

24. An optical fiber amplifying device according to claim 14, wherein said divided pumping light guide includes a filter for blocking said second amplified signal light exciting light and for selectively transmitting said second pumping light.

25. An optical fiber amplifying device according to claim 6, wherein said divided pumping light guide includes a filter for blocking said second amplified signal light exciting light and for selectively transmitting said second pumping light.

26. An optical fiber amplifying device according to claim 16, wherein said divided pumping light guide includes a filter for blocking said first amplified signal light exciting light and for selectively transmitting said second pumping light.

27. An optical fiber amplifying device according to claim 8, wherein said divided pumping light guide includes a filter for blocking said first amplified signal light exciting light and for selectively transmitting said second pumping light.

28. An optical fiber amplifying device according to claim 18, wherein said divided pumping light guide includes a filter for blocking said first amplified signal light exciting light and for selectively transmitting said second pumping light.

29. An optical fiber amplifying device according to claim 10, wherein said divided pumping light guide includes a filter for blocking said first amplified signal light exciting light and for selectively transmitting said second pumping light.

30. An optical fiber amplifying device according to claim 20, wherein said divided pumping light guide includes a filter for blocking said first amplified signal light exciting light and for selectively transmitting said second pumping light.

31. An optical fiber amplifying device according to claim 5, further comprising a signal light filter arranged between the divided pumping light coupler and the second optical coupler for blocking a naturally emitting light and for selectively transmitting only the first amplified signal light.

32. An optical fiber amplifying device according to claim 14, further comprising a signal light filter arranged between the divided pumping light coupler and the second optical coupler for blocking a naturally emitting light and for selectively transmitting only the first amplified signal light.

33. An optical fiber amplifying device, comprising:
first and second tandem-connected optical fiber amplifiers, said first optical fiber amplifier including:
a first fiber in which a first signal light having a first signal wavelength is inputted and a pumping light is applied from an external source, thereby outputting the first signal light after amplifying the first signal light;
a first pumping light outputting means for outputting a first pumping light having a first pumping wavelength and exciting the first optical fiber amplifier; and
a first optical coupler for coupling the first pumping light to the first fiber, said first fiber outputting a first amplified signal light by amplifying the first signal light,
said pumping light unused by one of said first optical fiber amplifier and said second optical fiber amplifier being applied to the other of said first optical fiber amplifier and said second optical fiber amplifier.

34. An optical fiber amplifying device according to claim 33, wherein said second optical fiber amplifier includes:
a second fiber in which a second signal light having a second signal wavelength is inputted and a pumping light is applied from an external source, thereby outputting the second signal light after amplifying the second signal light;
a second pumping light outputting means for outputting a second pumping light having a second pumping wavelength substantially the same as that of the first pumping wavelength;
a second optical coupler for outputting the second pumping light to said second fiber, said second optical fiber amplifier outputting a second amplified signal light by amplifying the second signal light;
an optical divider for outputting a divided pumping light by dividing the second pumping light from the second amplified signal light; and
a divided pumping light coupler for coupling the divided pumping light to one of the first optical fiber amplifier and said second optical coupler of said second optical fiber amplifier.

35. An optical fiber amplifying device according to claim 34, further comprising an in-line isolator coupled one of downstream and upstream of said second pumping light outputting means.

36. An optical fiber amplifying device according to claim 34, further comprising an in-line isolator coupled between said first optical coupler and said first fiber, said first optical coupler being coupled to another optical coupler positioned upstream of said first fiber.

37. An optical fiber amplifying device according to claim 34, further comprising an in-line isolator immediately upstream from said second fiber, said first pumping light outputting means being coupled to an optical coupler positioned upstream of said first fiber.

38. An optical fiber amplifying device, comprising:
first and second optical fiber amplifiers positioned in tandem and coupled together;
third and fourth optical fiber amplifiers coupled together and positioned in tandem and parallel to said first and second optical fiber amplifiers,
each of said first, second, third, and fourth optical fiber amplifiers including a pumping light outputting means and a divided pumping light coupler positioned one of upstream and downstream of said pumping light outputting means,
selected ones of said divided pumping light couplers of said first and second optical fiber amplifiers being coupled to selected ones of said divided pumping light couplers of said third and fourth optical fiber amplifiers.

39. An optical fiber amplifying device according to claim 38, wherein said divided pumping light coupler of said first optical fiber amplifier is coupled to said divided pumping light coupler of said third optical fiber amplifier, and
wherein said divided pumping light coupler of said second optical fiber amplifier is coupled to said divided pumping light coupler of said fourth optical fiber amplifier.

40. An optical fiber amplifying device according to claim 38, wherein said divided pumping light coupler of said first optical fiber amplifier is coupled to said divided pumping light coupler of said fourth optical fiber amplifier, and wherein said divided pumping light coupler of said second optical fiber amplifier is coupled to said divided pumping light coupler of said third optical fiber amplifier.

41. An optical fiber amplifying device according to claim 38, wherein said third and fourth optical fiber amplifiers have a same construction as that of said first and second optical fiber amplifiers, respectively, further comprising an in-line isolator positioned immediately downstream of said divided pumping light coupler of said first optical fiber amplifier and a second in-line isolator positioned immediately downstream of said divided pumping light coupler of said third optical fiber amplifier.

42. An optical fiber amplifying device according to claim 38, wherein said divided pumping light coupler of said third optical fiber amplifier is positioned upstream of said pumping light outputting means thereof, and wherein said divided pumping light coupler of said first optical fiber amplifier is coupled to said divided pumping light coupler of said third optical fiber amplifier, and wherein said divided pumping light coupler of said fourth optical fiber amplifier is positioned upstream of said pumping light outputting means thereof, and wherein said divided pumping light coupler of said second optical fiber amplifier is coupled to said divided pumping light coupler of said fourth optical fiber amplifier.

43. An optical fiber amplifying device according to claim 42, further comprising an in-line isolator positioned immediately downstream of said divided pumping light coupler of said first optical fiber amplifier and a second in-line isolator positioned immediately upstream of said divided pumping light coupler of said fourth optical fiber amplifier.

44. An optical fiber amplifying device according to claim 38, wherein said divided pumping light coupler of said third optical fiber amplifier is positioned upstream of said pumping light outputting means thereof, and wherein said divided pumping light coupler of said first optical fiber amplifier is coupled to said divided pumping light coupler of said fourth optical fiber amplifier, and wherein said divided pumping light coupler of said fourth optical fiber amplifier is positioned upstream of said pumping light outputting means thereof, and wherein said divided pumping light coupler of said second optical fiber amplifier is coupled to said divided pumping light coupler of said third optical fiber amplifier.

45. A method of amplifying a light input to an optical fiber amplifying device, said method comprising steps of:

inputting, to a first amplifying fiber, a first signal light having a first signal wavelength and applying a pumping light from an external source, thereby outputting the first signal light having been amplified;

coupling a first pumping light to the first amplifying fiber, and outputting, by said first amplifying fiber, a first amplified signal light by amplifying the first signal light;

inputting, to a second amplifying fiber, a second signal light having a second signal wavelength, and applying a pumping light applied from an external source, thereby outputting the second signal light after amplifying the second signal light;

outputting to said second amplifying fiber a second pumping light having a second pumping wavelength substantially the same as that of the first pumping wavelength and outputting a second amplified signal light by amplifying the second signal light;

outputting a divided pumping light by dividing the second pumping light from the second amplified signal light; and coupling the divided pumping light to the first amplifying fiber.

46. The optical fiber amplifying device according to claim 1, wherein, with fluctuating input power of said first signal light input to said first optical fiber amplifier, said second signal light outputted from said second fiber optical amplifier is automatically stabilized without pumping light output control.

47. The optical fiber amplifying device according to claim 33, wherein, with fluctuating input power of said first signal light input to said first optical fiber amplifier, said second signal light outputted from said second fiber optical amplifier is automatically stabilized without pumping light output control.

48. The method according to claim 45, wherein, with fluctuating input power of said first signal light input to said first amplifying fiber, said second signal light being outputted from said second amplifying fiber is automatically stabilized without pumping light output control.

* * * * *